(12) United States Patent
Sakaguchi et al.

(10) Patent No.: US 10,746,289 B2
(45) Date of Patent: Aug. 18, 2020

(54) SHIFT-BY-WIRE SYSTEM

(71) Applicants: DENSO CORPORATION, Kariya, Aichi-pref. (JP); HONDA MOTOR CO., LTD., Tokyo (JP)

(72) Inventors: Koji Sakaguchi, Kariya (JP); Masayoshi Iwata, Wako (JP); Yuichiro Takemori, Wako (JP); Taizo Mori, Wako (JP)

(73) Assignees: DENSO CORPORATION, Kariya (JP); HONDA MOTOR CO., LTD., Tokyo (JP)

( * ) Notice: Subject to any disclaimer, the term of this patent is extended or adjusted under 35 U.S.C. 154(b) by 7 days.

(21) Appl. No.: 16/325,232

(22) PCT Filed: Sep. 8, 2017

(86) PCT No.: PCT/JP2017/032414
§ 371 (c)(1),
(2) Date: Feb. 13, 2019

(87) PCT Pub. No.: WO2018/056073
PCT Pub. Date: Mar. 29, 2018

(65) Prior Publication Data
US 2019/0203829 A1 Jul. 4, 2019

(30) Foreign Application Priority Data
Sep. 20, 2016 (JP) .................................. 2016-182807

(51) Int. Cl.
*F16H 61/12* (2010.01)
*F16H 59/08* (2006.01)
(Continued)

(52) U.S. Cl.
CPC ............ *F16H 61/12* (2013.01); *F16H 59/08* (2013.01); *F16H 59/18* (2013.01); *F16H 59/54* (2013.01);
(Continued)

(58) Field of Classification Search
None
See application file for complete search history.

(56) References Cited

U.S. PATENT DOCUMENTS 7,084,597 B2 * 8/2006 Nakai ................. H02P 25/0925
318/254.1
7,609,012 B2 * 10/2009 Kamio ................ H02P 25/0925
318/266
(Continued)

*Primary Examiner* — Dirk Wright
(74) *Attorney, Agent, or Firm* — Nixon & Vanderhye P.C.

(57) ABSTRACT

A shift-by-wire system includes an actuator, a detent plate, a detent spring, a control unit, and a display device. The control unit includes a first position learning unit, a second position learning unit, and a power-on determination unit. When the power-on determination unit determines that the power on is the post-instantaneous interruption on while the vehicle power is turned on, the first position learning unit learns the first reference position or the second position learning unit learns the second reference position, (i) in a case where the display device still displays the N-range after the target-range determination unit determines the target range to the R-range while the display device displays the N-range or (ii) in a case where the display device displays the N-range after the target-range determination unit determines the target range to the N-range while the display device displays the R-range.

8 Claims, 20 Drawing Sheets

(51) Int. Cl.
*F16H 61/32* (2006.01)
*F16H 61/24* (2006.01)
*F16H 63/42* (2006.01)
*F16H 59/54* (2006.01)
*F16H 59/18* (2006.01)
*F16H 61/28* (2006.01)
*F16H 61/02* (2006.01)
*F16H 63/38* (2006.01)
*F16H 59/44* (2006.01)

(52) U.S. Cl.
CPC .............. *F16H 61/02* (2013.01); *F16H 61/24* (2013.01); *F16H 61/28* (2013.01); *F16H 61/32* (2013.01); *F16H 63/38* (2013.01); *F16H 63/42* (2013.01); *F16H 59/44* (2013.01); *F16H 2061/1292* (2013.01); *F16H 2061/247* (2013.01); *F16H 2061/326* (2013.01); *F16H 2063/423* (2013.01)

(56) References Cited

U.S. PATENT DOCUMENTS

| | | | |
|---|---|---|---|
| 8,134,322 B2* | 3/2012 | Nakai | H02P 25/08 |
| | | | 318/437 |
| 8,626,412 B2* | 1/2014 | Kimura | B60W 10/06 |
| | | | 701/54 |
| 10,288,171 B2* | 5/2019 | Yamamoto | F16H 61/32 |
| 2006/0197489 A1* | 9/2006 | Nakai | H02P 25/092 |
| | | | 318/701 |
| 2012/0123653 A1 | 5/2012 | Kimura et al. | |

* cited by examiner

SHIFT-BY-WIRE SYSTEM

CROSS REFERENCE TO RELATED APPLICATION

This application is the U.S. national phase of International Application No. PCT/JP2017/032414 filed Sep. 8, 2017 which designated the U.S. and claims priority to Japanese Patent Application No. 2016-182807 filed on Sep. 20, 2016, the entire contents of each of which are incorporated herein by reference.

TECHNICAL FIELD

The present disclosure relates to a shift-by-wire system which switches a shift range of an automatic transmission.

BACKGROUND ART

Conventionally, in a field of a vehicle control, a by-wire system which is instructed by a driver of a vehicle to controls an actuator configured to change a vehicle state by a by-wire control circuit is practically used.

According to Patent Literature 1, it is known that a shift-by-wire system switches a shift range of an automatic transmission of a vehicle. In this case, an electric actuator rotates to drive a transmission mechanism part of the automatic transmission to switch the shift range.

PRIOR ART LITERATURE

Patent Literature

Patent Literature 1: JP5170215B2

SUMMARY OF INVENTION

In the shift-by-wire system of Patent Literature 1, in a power recovery (power on) after an instantaneous interruption of a vehicle power, a learning state of a reference position is reset, and a notification or a warning is displayed to the driver when a target range is an R-range or an N-range. In the above displaying, a learning of the reference position is executed again, and normally recovers. In the above case, it is possible that the driver is uncomfortable in response to a displaying of the notification or the warning when the shift-by-wire system does not fail.

It is an object of the present disclosure to provide a shift-by-wire system which has a simple configuration and can safely recover to a normal control state even though a vehicle power is instantaneously interrupted.

The shift-by-wire system of the present disclosure switches a shift range of an automatic transmission in response to a signal transmitted from a shift selection unit operated by a driver of a vehicle.

The shift-by-wire system includes an actuator, a detent plate, a detent spring, a control unit, and a display device.

The actuator includes a motor part, an encoder, and a deceleration part.

The motor part is configured to rotate by a power.

The encoder outputs a pulse signal in response to a rotation of the motor part, and is configured to detect an actual range of the automatic transmission.

The deceleration part decelerates and outputs the rotation of the motor part.

The detent plate is connected with the deceleration part and rotates by the actuator. The detent plate includes a first recession part, a second recession part, and plural intermediate recession parts.

The first recession part is formed at one side of a rotation direction and corresponds to a P-range that is a range for parking. The first recession part includes a first wall located at a position opposite to the second recession part.

The second recession part is formed at the other side of the rotation direction and corresponds to a D-range that is a range for moving forward or a lowest speed gear range. The second recession part includes a second wall located at a position opposite to the first recession part.

The intermediate recession parts are interposed between the first recession part and the second recession part and correspond to an R-range that is a range for moving backward, an N-range that is a neutral range or a range for moving forward other than the lowest speed gear range.

The detent spring includes a limitation part and limits a rotation of the detent plate while the limitation part is fitted into the first recession part, the plural intermediate recession parts or the second recession part, and the detent spring is configured to fix the shift range of the automatic transmission.

The control unit includes a target-range determination unit to determine a target range based on the signal transmitted from the shift selection unit, and controls a rotation of the actuator to control the shift range of the automatic transmission to be the target range determined by the target-range determination unit; and The display device is located in front of a driving seat of the vehicle and is configured to display the actual range detected by the encoder.

Further, the control unit includes a first position learning unit, a second position learning unit, and a power-on determination unit.

The first position learning unit detects a state where a minimum value or a maximum value of a counter value of the pulse signal output from the encoder does not change in a predetermined time interval when the actuator rotates in a direction where the rotation of the actuator is limited while the limitation part is in contact with the first wall. Thus, the first position learning unit learns a first reference position of the actuator corresponding to the P-range.

The second position learning unit detects a state where a minimum value or a maximum value of a counter value of the pulse signal output from the encoder does not change in a predetermined time interval when the actuator rotates in a direction where the rotation of the actuator is limited while the limitation part is in contact with the second wall. Thus, the second position learning unit learns a second reference position of the actuator corresponding to the D-range or the lowest speed gear range.

The power-on determination unit determines whether a power on is a normal on caused by a normal on operation of the driver or is a post-instantaneous interruption on caused by a recovery of an instantaneous interruption of a vehicle power where the vehicle power is turned on.

Further, when the power-on determination unit determines that the power on is the normal on caused by the normal on operation of the driver where the vehicle power is turned on, the control unit learns the first reference position by the first position learning unit.

When the power-on determination unit determines that the power on is the post-instantaneous interruption on caused by the recovery of the instantaneous interruption of the vehicle power where the vehicle power is turned on, the control unit controls the display device to display the N-range and controls the target-range determination unit to determine the target range to the R-range. In this case, the control unit learns the first reference position by the first position learning unit or learns the second reference position by the second position learning unit, in a case where the display device still displays the N-range.

Further, when the power-on determination unit determines that the power on is the post-instantaneous interruption on caused by the recovery of the instantaneous interruption of the vehicle power where the vehicle power is turned on, the control unit controls the display device to display the R-range and controls the target-range determination unit to determine the target range to the N-range. In this case, the control unit learns the first reference position by the first position learning unit or learns the second reference position by the second position learning unit, in a case where the display device displays the N-range.

According to the above configuration, since the notification and the warning are not displayed to the driver in the processing where the actual range is switched from the N-range to the R-range or from the R-range to the N-range while the power recovers after the instantaneous interruption of the vehicle power, the driver is comfortable.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENTS

Figure 1:
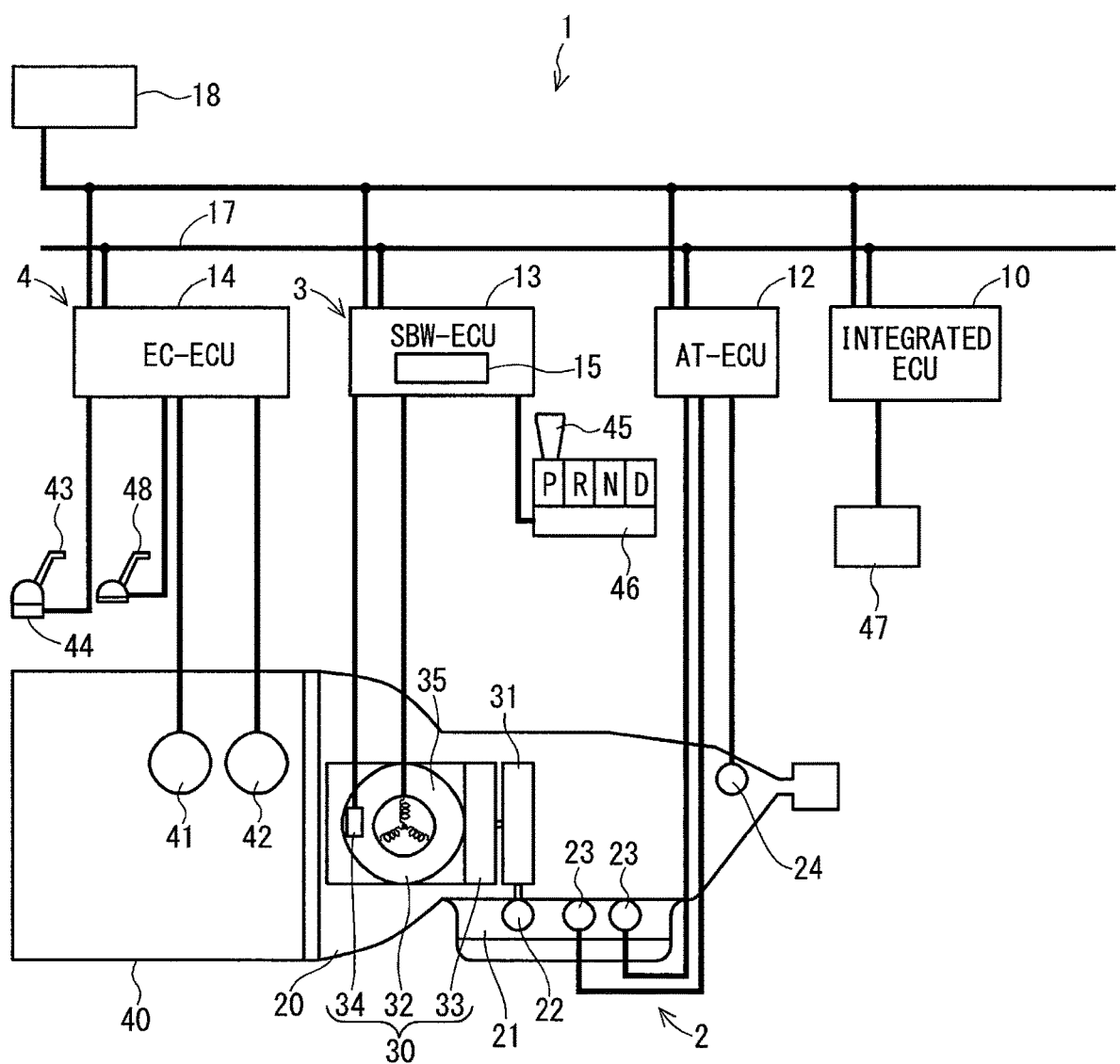
FIG. 1 is a schematic diagram showing a vehicle control system including a shift-by-wire system according to a first embodiment of the present disclosure.

Hereinafter, a shift-by-wire system according to embodiments of the present disclosure will be described with reference to drawings. In the embodiments, the same reference numerals are given to substantially the same configurations as those of a first embodiment, and a description thereof will be omitted. A present embodiment includes the first embodiment, a second embodiment and a third embodiment. Further, in following description, an electronic control unit is referred to as an ECU.

First Embodiment

FIG. 1 shows a vehicle control system 1 including the shift-by-wire system 3 according to the first embodiment.

The vehicle control system 1, for example, is mounted to a vehicle with four wheels, and includes an automatic transmission control system 2, the shift-by-wire system 3, an engine control system 4 and an integrated ECU 10.

The automatic transmission control system 2 includes an AT-ECU 12, the shift-by-wire system 3 includes a SBW-ECU 13 as a control unit, and the engine control system 4 includes an EC-ECU 14.

Each of the AT-ECU 12, the SBW-ECU 13 and the EC-ECU 14 is an electric circuit mainly constituted by a microcomputer. The AT-ECU 12, the SBW-ECU 13 and the EC-ECU 14 are electrically or optically connected with each other via a LAN line 17 in the vehicle.

The AT-ECU 12, the SBW-ECU 13 and the EC-ECU 14 are electrically connected with a battery 18 that is a power source of the vehicle, and operate by a power supplied from the battery 18.

The integrated ECU 10, similar to the AT-ECU 12, the SBW-ECU 13 and the EC-ECU 14, is electrically connected with the battery 18, and controls the vehicle control system 1 by cooperation with the AT-ECU 12, the SBW-ECU 13 and the EC-ECU 14.

The integrated ECU 10 is connected with a display device 47.

The display device 47 is located in front of a driving seat of the vehicle and can display an actual range of the automatic transmission 20. Next, the actual range of the automatic transmission 20 is referred to as an actual range.

The automatic transmission control system 2 drives the automatic transmission 20 of the vehicle by a hydraulic pressure and includes a hydraulic pressure circuit 21.

The automatic transmission 20 includes a D-range and an R-range which are shift ranges used as traveling ranges, and a P-range and an N-range which are shift ranges used as non-traveling ranges. The automatic transmission 20 includes friction engagement elements to be engaged with the shift ranges. In addition, the D-range is a range for moving forward, the R-range is a range for moving backward, the P-range is a range for parking, and the N-range is a neutral range.

The hydraulic pressure circuit 21 includes a manual valve 22 and electromagnetic valves 23, and switches the shift ranges and transmission gears of the automatic transmission 20.

The manual valve 22 is a spool valve as a range-position selection mechanism and switches the hydraulic pressure circuit 21 by moving in an axial direction. When the hydraulic pressure circuit 21 is switched, the automatic transmission 20 is set to one of the D-range, the R-range, the P-range and the P-range.

The electromagnetic valve 23 drives a respective friction engagement element of the automatic transmission 20 by the hydraulic pressure. Each of the friction engagement elements closes or opens in response to the hydraulic pressure supplied from the electromagnetic valve 23.

The AT-ECU 12 is electrically connected with an electric element such as the electromagnetic valve 23 and the like, electrically controls the hydraulic pressure supplied from each of the electromagnetic valves 23, and closes or opens the friction engagement element of the automatic transmission 20.

The AT-ECU 12 is electrically connected with a vehicle speed sensor 24, and controls the electromagnetic valve 23 by receiving a detection signal output by the vehicle speed sensor 24.

The vehicle speed sensor 24 can measure a vehicle speed Vc [km/h] of the vehicle from a rotation speed of an output shaft of the automatic transmission 20. The vehicle speed sensor 24, for example, measures the vehicle speed Vc by converting a change of a magnetic flux at a non-contact magnetoresistive effect element into a change of an electric resistance while a magnet with plural poles rotates in response to a rotation of the output shaft of the automatic transmission 20.

The vehicle speed Vc is output to the EC-ECU 14 via the AT-ECU 12. According to the present embodiment, the vehicle speed Vc is equivalent to a speed.

The shift-by-wire system 3 includes an actuator 30 and a transmission mechanism part 31.

Figure 2:
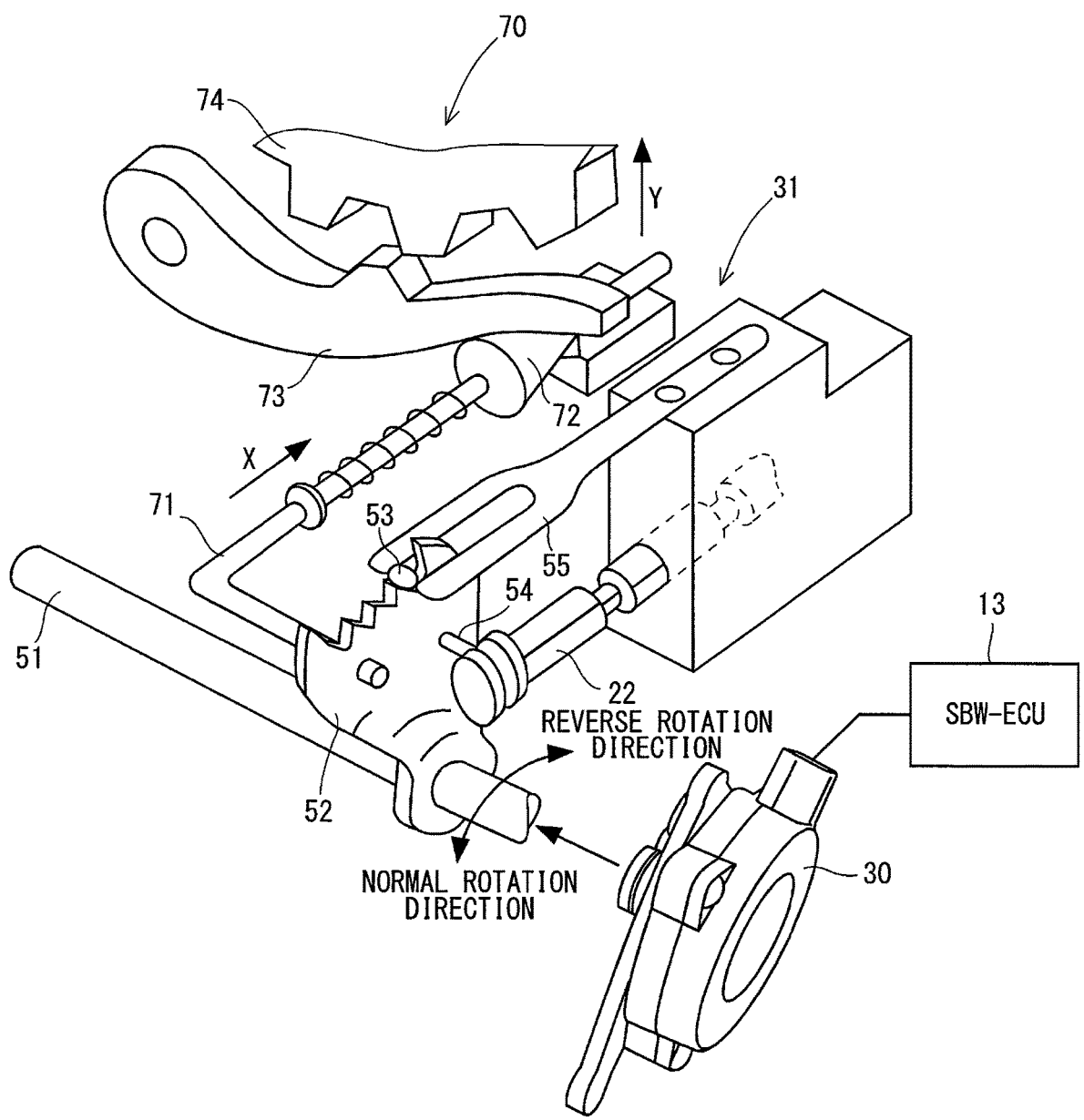
FIG. 2 is a diagram showing a transmission mechanism part of the shift-by-wire system and components in the vicinity of the transmission mechanism part, according to the first embodiment the present disclosure.

As shown in FIG. 2, the actuator 30 drives a parking lock mechanism 70.

Return to FIG. 1, the actuator 30 includes a motor part 32, a deceleration part 33 and an encoder 34.

Figure 3:
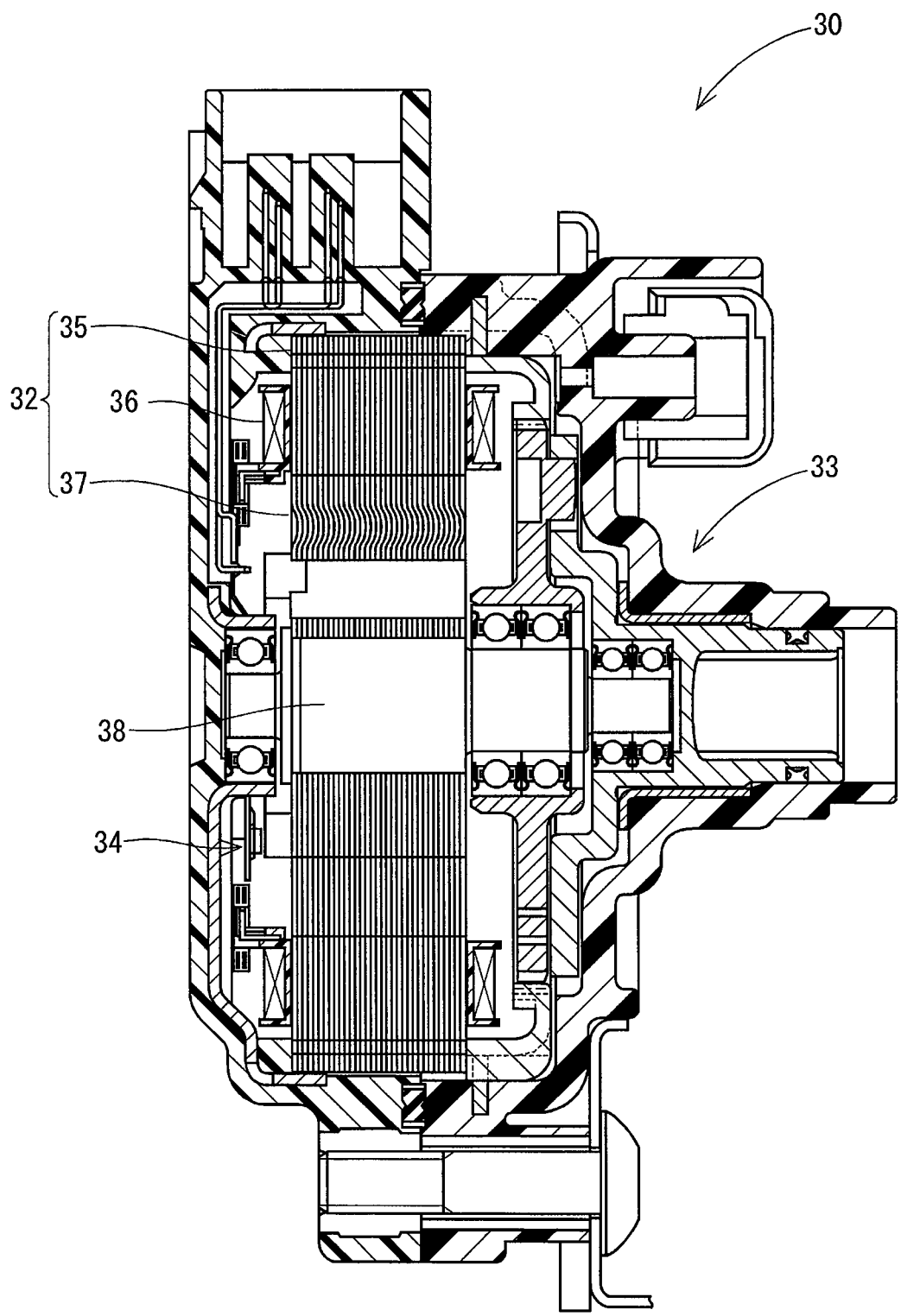
FIG. 3 is a cross-sectional view showing an actuator of the shift-by-wire system according to the first embodiment of the present disclosure.

As shown in FIG. 3, the motor part 32 is a switch reluctance motor (SR motor) that is a brushless motor to generate a driving force without using a permanent magnet. The motor part 32 includes a stator 35 and a rotor 37.

The stator 35 is fitted to coils 36 arranged in a rotation direction.

The rotor 37 is located at an interior of the stator 35 and includes a shaft member 38 at a center part of the rotor 37. The rotor 37 is rotatably supported by a housing of the actuator 30.

The rotor 37 and the shaft member 38 rotate when the SBW-ECU 13 successively energizes the coils 36 at a predetermined timing.

The deceleration part 33 decelerates a rotation motion of the shaft member 38 and transmits to the transmission mechanism part 31. The transmission mechanism part 31 transmits a rotation driving force transmitted from the deceleration part 33 to the manual valve 22 and the parking lock mechanism 70.

The encoder 34 is an encoder of an incremental type and is located in the housing of the actuator 30. The encoder 34 is constituted by a magnet that rotates integrally with the rotor 37, a Hall IC for magnetism detection and the like. The encoder 34 outputs a pulse signal in response to a change of a rotation angle of the rotor 37.

The SBW-ECU 13 decreases or increases a value (counter value) for counting in response to the pulse signal output by the encoder 34. The SBW-ECU 13 detects a rotation state of the rotor 37. The motor part 32 can rotate with a high speed without stepping out while the SBW-ECU 13 detects the rotation state of the rotor 37.

In addition, an initial drive control for an excitation energization phase learning (synchronization of an energization phase and the counter value in response to the pulse signal output by the encoder 34) of the motor part 32 is executed, every time that a vehicle power is turned on (i.e., every time that the shift-by-wire system 3 is activated). A rotation of the actuator 30 can be appropriately controlled by the initial drive control.

Return to FIG. 2, the transmission mechanism part 31 converts the rotation driving force of the actuator 30 into a linear motion and transmits the linear motion to the manual valve 22. The transmission mechanism part 31 includes a manual shaft 51, a detent plate 52 and a detent spring 55.

The manual shaft 51 is connected with the deceleration part 33 and can rotate in response to the rotation driving force of the motor part 32.

The detent plate 52 is integrated with the manual shaft 51 by extending from the manual shaft 51 in a direction outward of a radial direction of the manual shaft 51. The detent plate 52 can rotate according to the actuator 30. The detent plate 52 includes a pin 54.

The pin 54 is connected with the manual valve 22. The detent plate 52 rotates together with the manual shaft 51 via the pin 54, and the manual valve 22 reciprocates in an axial direction by the pin 54.

Figure 4:
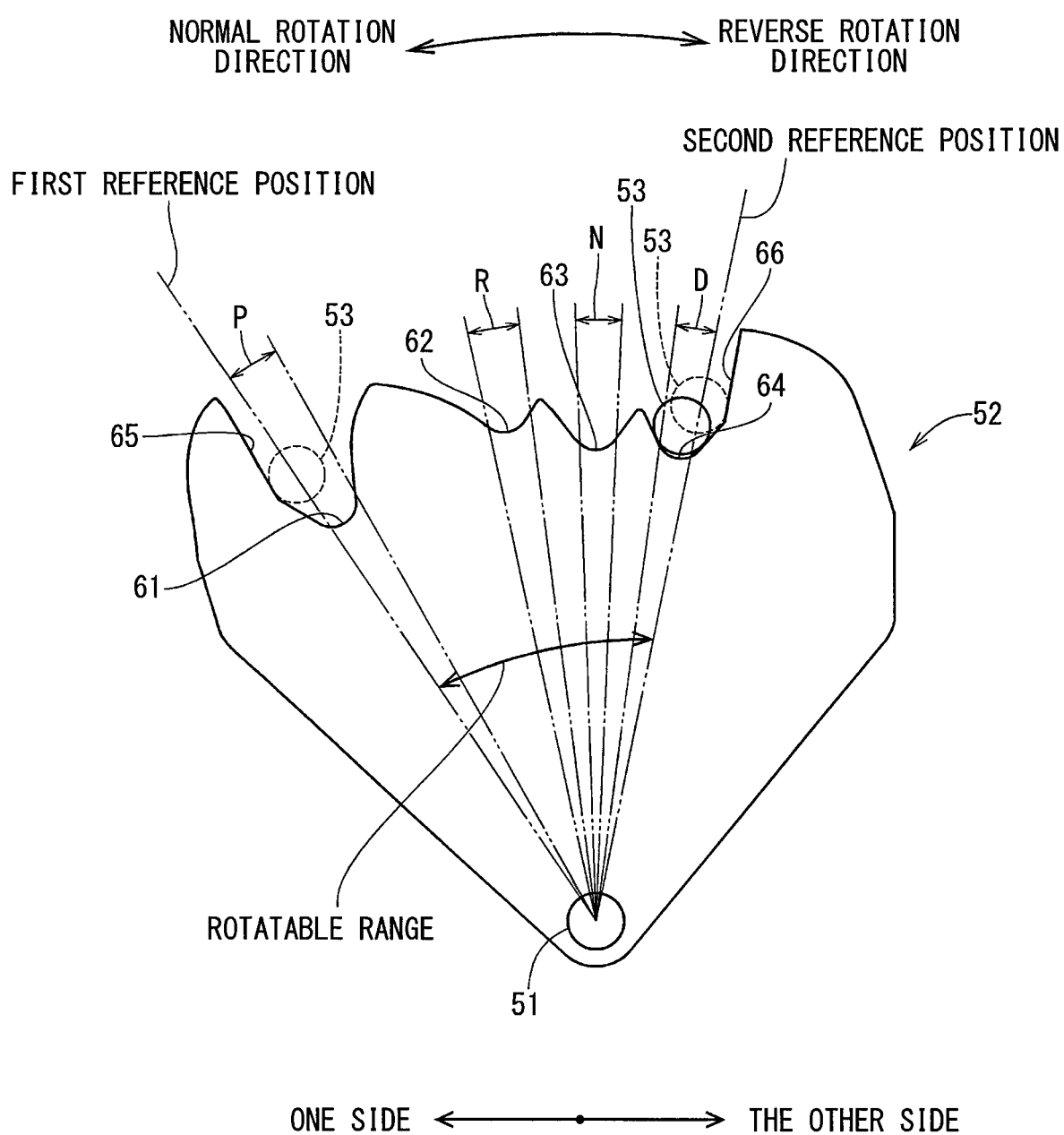
FIG. 4 is a detent plate of the shift-by-wire system according to the first embodiment of the present disclosure.

As shown in FIG. 4, the detent plate 52 includes a first recession part 61, intermediate recession parts 62,63 and a second recession part 64 which are located at positions outward of a radial direction of the manual shaft 51.

The first recession part 61 is located at one side of a rotation direction of the detent plate 52.

The second recession part 64 is located at the other side of the rotation direction of the detent plate 52.

The intermediate recession parts 62, 63 are interposed between the first recession part 61 and the second recession part 64 and include a first intermediate recession part 62 and a second intermediate recession part 63.

The first recession part 61 is formed to correspond to the P-range that is the shift range of the automatic transmission 20. The first recession part 61 includes a first wall 65 located at a position opposite to the second recession part 64.

The first intermediate recession part 62 is formed to correspond to the R-range.

The second intermediate recession part 63 is formed to correspond to the N-range.

The second recession part 64 is formed to correspond to the D-range. The second recession part 64 includes a second wall 66 located at a position opposite to the first recession part 61. In addition, the second recession part 64 may be formed to correspond to a lowest speed gear range.

The detent spring 55 includes a detent roller 53 as a limitation part at tip end of the detent spring 55.

When a predetermined force is applied to the detent plate 52 in the rotation direction via the manual shaft 51, the detent roller 53 passes protrusion parts defined between recession parts 61, 62, 63 and 64 and moves to other recession parts 61, 62, 63 and 64 which are next to the recession parts 61, 62, 63 and 64. The manual shaft 51 rotates in response to the actuator 30, a position of the manual valve 22 in the axial direction and a state of the parking lock mechanism 70 change, and the shift range of the automatic transmission 20 is changed.

The detent roller 53 limits the rotation of the detent plate 52 by fitting into one of the first recession part 61, the intermediate recession parts 62, the intermediate recession part 63 and the second recession part 64. The rotation of the detent plate 52 is limited, the position of the manual valve 22 in the axial direction and the state of the parking lock mechanism 70 are determined, and the shift range of the automatic transmission 20 can be fixed.

A direction where the deceleration part 33 rotates when the shift range is switched from a side of the P-range to a side of the R-range, the N-range and the P-range is referred to as a normal rotation direction.

A direction where the deceleration part 33 rotates when the shift range is switched from a side of the D-range to a side of the N-range, the R-range and the P-range is referred to as a reverse rotation direction.

A rotatable range of the detent plate 52 is a range from a position where the first wall 65 is in contact with the detent roller 53 to a position where the second wall 66 is in contact with the detent roller 53.

As shown in FIG. 2, the rotatable range is a rotatable range of the detent plate 52 in accordance with the detent roller 53. Thus, when considering a bending quantity of the detent spring 55, an extension quantity of the detent spring 55, a twist quantity of the manual shaft 51 and the like, an absolute rotatable range of the detent plate 52 is greater than the rotatable range shown in FIG. 4.

The state of the parking lock mechanism 70 when the shift range is the D-range, that is, when the shift range is a range other than the P-range is indicated. In the above state, since a parking gear 74 is not locked by a parking lock pole 73, a rotation of a wheel of the vehicle is not disturbed.

When the deceleration part 33 rotates in the reverse rotation direction from the above state, a rod 71 is pressed in an X-arrow direction via the detent plate 52, and a tapered part 72 located at a tip end of the rod 71 upwardly presses the parking lock pole 73 in a Y-arrow direction.

The parking lock pole 73 is engaged with the parking gear 74, the parking gear 74 is locked, the detent roller 53 is fitted to the first recession part 61, and the rotation of the wheel is limited. In this case, the actual range is the P-range.

Return to FIG. 1 again, the SBW-ECU 13 is electrically connected with the motor part 32, the encoder 34 and a range selector 45.

The range selector 45 is a shift selection unit and includes a selector sensor 46.

The selector sensor 46 detects the range which is instructed by that the driver of the vehicle operates the range selector 45, and outputs a detection signal to the SBW-ECU 13. Hereinafter, the range which is instructed by that the driver of the vehicle operates the range selector 45 is referred to as an instruction range.

The SBW-ECU 13 determines a target range based on a signal of the instruction range output from the selector sensor 46. For example, the SBW-ECU 13 determines the target range based on the signal of the selector sensor 46, a signal of a brake pedal 48 and a signal of the vehicle speed sensor 24.

The SBW-ECU 13 controls the rotation of the actuator 30 to control the shift range of the automatic transmission 20 to be the target range. The SBW-ECU 13 switches the actual range of the automatic transmission 20 to a range which is intended by the driver.

Since the encoder 34 is of an incremental type and can detect only a relative rotation position of the motor part 32, the SBW-ECU 13 learns a reference position corresponding to an absolute position of the deceleration part 33 to switch the shift range to a requested range.

The SBW-ECU 13 obtains the rotation position of the actuator 30 corresponding to each shift range based on the reference position and a predetermined rotation quantity, after learning the reference position. The actuator 30 rotates to the rotation position that is obtained by calculation, and the actual range is switched to a requested shift range.

The SBW-ECU 13 can detect the actual range at that time point by calculation based on the reference position, the predetermined rotation quantity and the counter value of the pulse signal from the encoder 34, after learning the reference position.

The SBW-ECU 13 causes the display device 47 to display information of the actual range via the integrated ECU 10. The actual range can be confirmed by the driver in response to the display device 47 which displays the information.

The EC-ECU 14 is electrically connected with a throttle 41, an injector 42, an accelerator sensor 44 and the brake pedal 48 which are in an engine 40 of the vehicle.

The throttle 41 adjusts a flow rate of an intake gas flowing through an intake passage of the engine 40.

The injector 42 adjusts a quantity of a fuel injected to each cylinder of the intake passage of the engine 40.

The accelerator sensor 44 is connected with an accelerator pedal 43. The accelerator sensor 44 detects an accelerator opening degree Ac that is an operation quantity of the accelerator pedal 43 caused by the driver, and outputs a detection signal to the EC-ECU 14.

The accelerator opening degree Ac increases while the driver presses the accelerator pedal 43.

When the driver does not press the accelerator pedal 43, the accelerator opening degree Ac is zero. In this case, zero includes a commonsense error range. According to the present disclosure, zero may be interpreted in the same way as the above description.

The EC-ECU 14 electrically controls the throttle 41 and the injector 42 based on the operation of the accelerator pedal 43 caused by the driver, and adjusts a rotation speed of the engine 40 and an output torque of the engine 40.

The brake pedal 48 can be operated by a foot of the driver and operates by a hydraulic pressure. When the brake pedal 48 is pressed, the hydraulic pressure is generated at a brake master cylinder located in the vicinity of a based part of the pedal and is transmitted to a brake body of each wheel.

The brake body can convert a kinetic energy where the vehicle moves forward or backward into a thermal energy by a friction. The thermal energy converted by the brake body is discharged to the atmosphere.

The brake pedal 48 output a result whether the driver presses the brake pedal 48 or not to the EC-ECU 14.

The SBW-ECU 13 acquires information including the accelerator opening degree Ac and whether the brake pedal 48 is pressed, from the EC-ECU 14.

The learning of the reference position of the actuator 30 executed by the SBW-ECU 13 will be described. According to the present embodiment, the learning of the reference position of the actuator 30 is a learning of a first reference position or a learning of a second reference position.

Return to FIG. 4 again, the first reference position is the rotation position of the actuator 30 in a state where the detent roller 53 is in contact with the first wall 65, and is a position corresponding to the P-range of the shift range.

The second reference position is the rotation position of the actuator 30 in a state where the detent roller 53 is contact with the second wall 66, and is a position corresponding to the D-range of the shift range.

When the SBW-ECU 13 executes the learning of the first reference position, the SBW-ECU 13 controls the actuator 30 to rotate in the reverse rotation direction that is a direction where the rotation of the actuator 30 is limited, while the detent roller 53 is in contact with the first wall 65. The detent spring 55 starts to bend when pressed while the detent roller 53 is in contact with the first wall 65.

A state where a minimum value or a maximum value of the counter value of the pulse signal output from the encoder 34 does not change in a predetermined time interval while the detent spring 55 bends is detected.

The SBW-ECU 13 determines that rotations of the detent plate 52 and the actuator 30 are stopped from a state detected by the encoder 34. Whether monitoring the minimum value or the maximum value of the counter value is set according to a property of the encoder 34. In addition, a case where the minimum value or the maximum value of the counter value does not change in the predetermined time interval indicates a state where the detent plate 52 does not move.

The SBW-ECU 13 stores the counter value at the above time point in a volatile memory such as a RAM and the like in a storage unit 15, as a value corresponding to the first reference position of the actuator 30. Thus, the learning of the first reference position of the actuator 30 is completed. In this case, the SBW-ECU 13 functions as a first position learning unit.

Predetermined values indicating rotation quantities of the motor part 32 from the first reference position to positions corresponding to the shift ranges are referred to as first predetermined values.

The storage unit 15 previously stores the first predetermined values.

The SBW-ECU 13 obtains the rotation position of the actuator 30 corresponding to each shift range based on the first reference position and the first predetermined values, after learning the first reference position. The actuator 30 rotates to the rotation position that is obtained by calculation, and the SBW-ECU 13 is in a normal control state where the SBW-ECU 13 can switch the actual range to a requested shift range.

When the SBW-ECU 13 executes the learning of the second reference position, the SBW-ECU 13 controls the actuator 30 to rotate in the normal rotation direction that is a direction where the rotation of the actuator 30 is limited, while the detent roller 53 is in contact with the second wall 66. The detent spring 55 starts to expand when drawn while the detent roller 53 is in contact with the second wall 66.

Similar to a case where the SBW-ECU 13 executes the learning of the first reference position, the SBW-ECU 13 determines that rotations of the detent plate 52 and the actuator 30 are stopped from a state detected by the encoder 34.

The SBW-ECU 13 stores the counter value at the above time point in the storage unit 15, as a value corresponding to the second reference position of the actuator 30. Thus, the learning of the second reference position of the actuator 30 is completed. In this case, the SBW-ECU 13 functions as a second position learning unit.

Predetermined values indicating rotation quantities of the motor part 32 from the second reference position to positions corresponding to the shift ranges are referred to as second predetermined values.

The storage unit 15 previously stores the second predetermined values.

The SBW-ECU 13 obtains the rotation position of the actuator 30 corresponding to each shift range based on the second reference position and the second predetermined values, after learning the second reference position. The actuator 30 rotates to the rotation position that is obtained by calculation, and the SBW-ECU 13 is in the normal control state where the SBW-ECU 13 can switch the actual range to the requested shift range.

The SBW-ECU 13 executes the learning of the first reference position or the second reference position to execute a normal control of the shift-by-wire system 3.

The first predetermined values and the second predetermined values are setting values which are set by considering angles of the recession parts 61, 62, 63 and 64 of the detent plate 52, backlash between engagement parts, a bending quantity of the detent spring 55, an expansion quantity of the detent spring 55, or the like.

The first predetermined values and the second predetermined values are stored in a nonvolatile memory such as a ROM, an EEPROM (Registered trademark), or the like in the storage unit 15. The first predetermined values and the second predetermined values do not disappear even though a supply from the vehicle power to the storage unit 15 is cut off.

The shift-by-wire system 3 according to the present embodiment cannot detect an absolute rotation position of the actuator 30 by the encoder 34. The SBW-ECU 13 learns the first reference position or the second reference position. The SBW-ECU 13 obtains the rotation position of the actuator 30 corresponding to each shift range based on the first reference position and the first predetermined values or based on the second reference position and the second predetermined values. The actuator 30 rotates to the rotation position that is obtained by calculation, and the actual range is switched to a requested shift range.

Processings of the learning of the reference position of the actuator 30 executed by the SBW-ECU 13 will be described referring to time charts in FIGS. 5 to 10. In the time charts of the drawings, horizontal axes indicate time.

Figure 5:
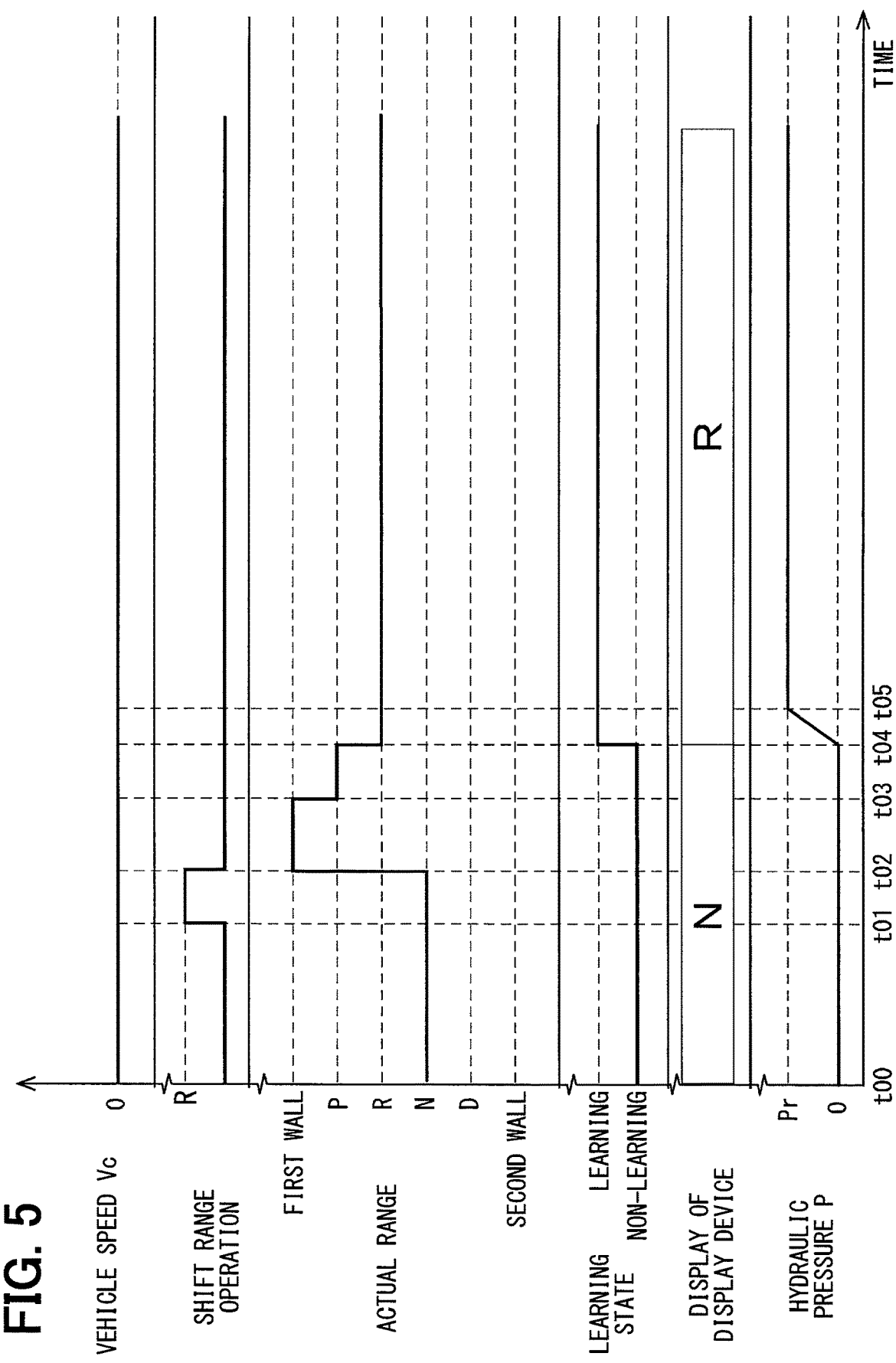
FIG. 5 is a time chart relating to a learning of a rotation position of the actuator caused by the shift-by-wire system according to the first embodiment of the present disclosure.

The processing of the learning of the reference position of the actuator 30 executed by the SBW-ECU 13, in a case where the shift range is changed to the R-range after power recovery of an instantaneous interruption of the vehicle power while the vehicle speed Vc is zero and the shift range is the N-range, is described referring to the time chart in FIG. 5. When the vehicle speed Vc is zero, that is, when Vc=0, the vehicle is being stopped.

A time point t00 is a power recovery time point of the instantaneous interruption of the vehicle power.

As shown in FIG. 5, the power recovers at the time point t00 after the instantaneous interruption of the vehicle power, and an operation of the shift range is not executed until a time point t01. The N-range is displayed at the display device 47 as the actual range. Since the actual range is the N-range, the hydraulic pressure P of the hydraulic pressure circuit 21 is zero.

A signal to set the target range to the R-range is output at the time point t01, and a processing of setting the target range to the R-range is completed at a time point t02.

The detent roller 53 is in contact with the first wall 65 and the learning of the first reference position is executed at the time point t02, and the learning of the first reference position is completed at a time point t03. The SBW-ECU 13 may learn the second reference position from the time point t02 to the time point t03 without learning the first reference position.

The actual range is switched to the P-range at the time point t03, and the actual range is switched to the R-range at a time point t04.

At the time point t04, the display device 47 displays the R-range from the N-range, and the hydraulic pressure P increases in response to the hydraulic pressure circuit 21.

At a time point t05, the hydraulic pressure P becomes a hydraulic-pressure predetermined value Pr. The hydraulic-pressure predetermined value Pr is set to a value where friction engagement elements of the automatic transmission 20 can be engaged.

A time interval from a time point that the learning of the first reference position or the second reference position starts to a time point that a switching of the shift range is completed, that is, a time interval from the time point t02 to the time point t04 is set to a time interval where the driver is comfortable relative to operations which is around 0.5 seconds.

Figure 6:
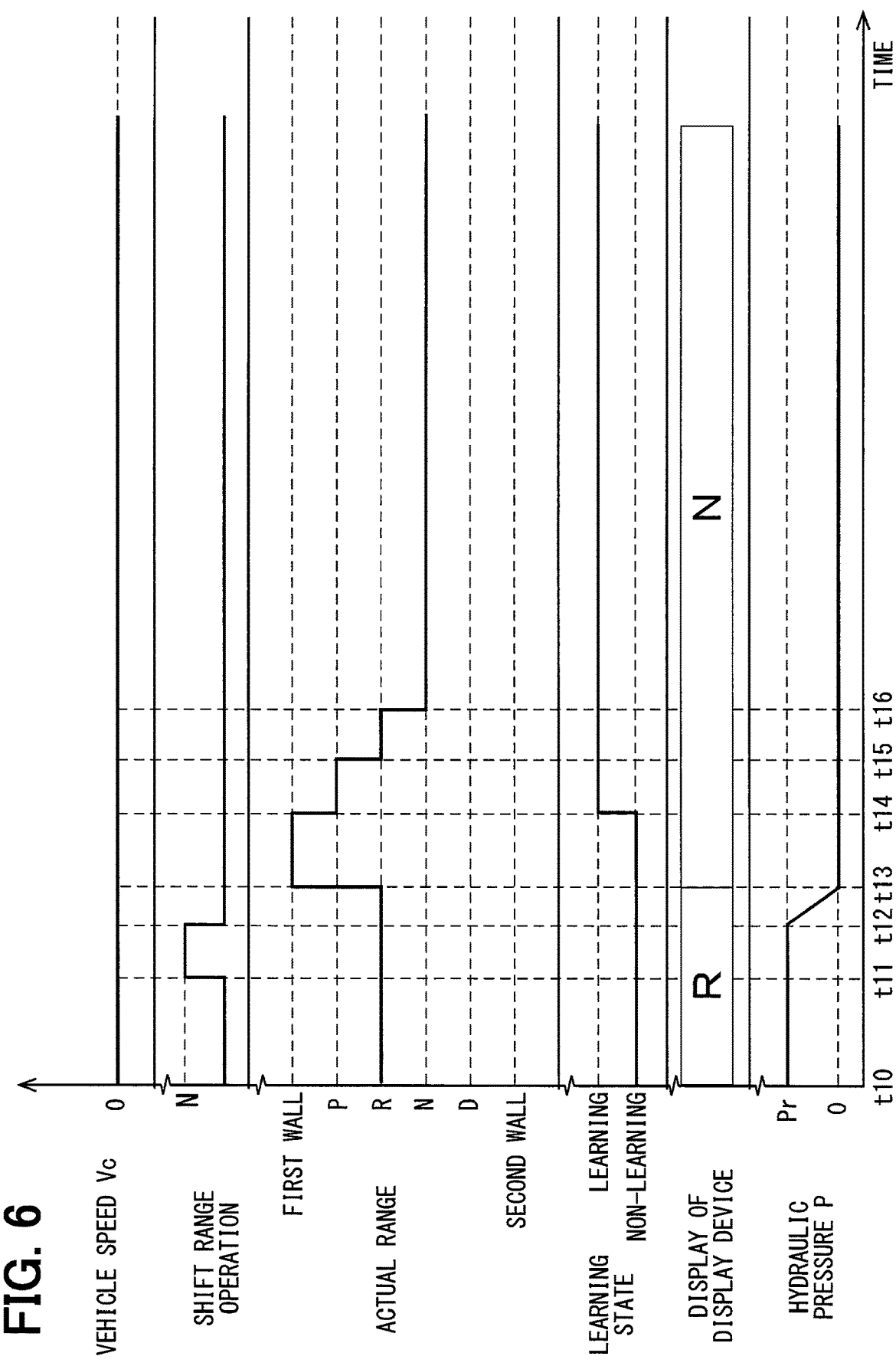
FIG. 6 is a time chart relating to the learning of the rotation position of the actuator caused by the shift-by-wire system according to the first embodiment of the present disclosure.

The processing of the learning of the reference position of the actuator 30 executed by the SBW-ECU 13, in a case where the shift range is changed to the N-range after power recovery of an instantaneous interruption of the vehicle power while the vehicle speed Vc is zero and the shift range is the R-range, is described referring to the time chart in FIG. 6.

A time point t10 is the power recovery time point of the instantaneous interruption of the vehicle power.

As shown in FIG. 6, the power recovers at the time point t10 after the instantaneous interruption of the vehicle power, and the operation of the shift range is not executed until a time point t11. The R-range is displayed at the display device 47 as the actual range. Since the actual range is the R-range, the hydraulic pressure P of the hydraulic pressure circuit 21 is the hydraulic-pressure predetermined value Pr.

A signal to set the target range to the N-range is output at the time point t11, and a processing of setting the target range to the N-range is completed at a time point t12. The hydraulic pressure P decreases in response to the hydraulic pressure circuit 21 at the time point t12, and the hydraulic pressure P becomes zero at a time point t13.

At the time point t13, the display device 47 displays the R-range from the N-range. The detent roller 53 is in contact with the first wall 65 and the learning of the first reference position is executed at the time point t13, and the learning of the first reference position is completed at a time point t14. The SBW-ECU 13 may learn the second reference position from the time point t13 to the time point t14.

The shift range is switched to the P-range at the time point t14, the shift range is switched to the R-range at a time point t15, and the shift range is switched to the N-range at a time point t16.

A time interval from the time point t13 to the time point t16, similar to the time interval from the time point t02 to the time point t04, is about 0.5 seconds.

When the vehicle speed Vc exceeds zero and is less than a vehicle-speed predetermined value Vr, 0<Vc<Vr. In this case, the vehicle speed Vc, for example, is 1 km/h. The vehicle-speed predetermined value Vr is a value that is optionally set, or is calculated by a test value or a simulation.

Figure 7:
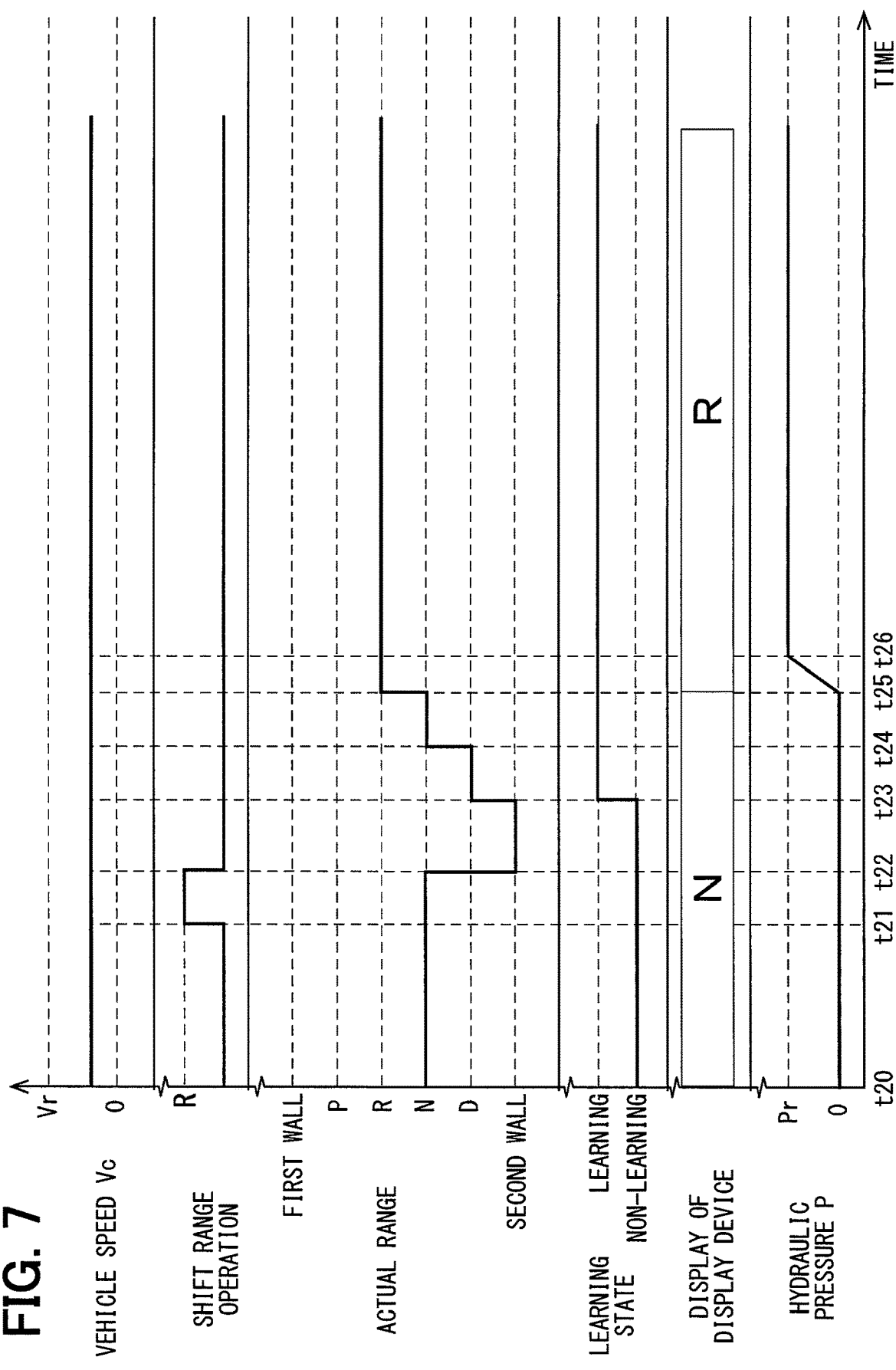
FIG. 7 is a time chart relating to the learning of the rotation position of the actuator caused by the shift-by-wire system according to the first embodiment of the present disclosure.

In the above case, the processing of the learning of the reference position of the actuator 30 executed by the SBW-ECU 13, in a case where the shift range is changed to the R-range after power recovery of an instantaneous interruption of the vehicle power while the shift range is the N-range, is described referring to the time chart in FIG. 7.

A time point t20 is a power recovery time point of the instantaneous interruption of the vehicle power.

As shown in FIG. 7, the power recovers at the time point t20 after the instantaneous interruption of the vehicle power, and the operation of the shift range is not executed until a time point t21. The N-range is displayed at the display device 47 as the actual range. Since the actual range is the N-range, the hydraulic pressure P of the hydraulic pressure circuit 21 is zero.

A signal to set the target range to the R-range is output at the time point t21, and a processing of setting the target range to the R-range is completed at a time point t22.

The detent roller 53 is in contact with the second wall and the learning of the second reference position is executed at the time point t22, and the learning of the second reference position is completed at a time point t23.

The shift range is switched to the D-range at the time point t23, the shift range is switched to the N-range at a time point t24, and the shift range is switched to the R-range at a time point t25.

At the time point t25, the display device 47 displays the N-range.

The hydraulic pressure P increases in response to the hydraulic pressure circuit 21 at the time point t25, and the hydraulic pressure P becomes the hydraulic-pressure predetermined value Pr at a time point t26.

A time interval from the time point t22 to the time point t25, similar to the time interval from the time point t02 to the time point t04, is about 0.5 seconds.

When the vehicle speed Vc exceeds zero and is less than the vehicle-speed predetermined value Vr, that is, when 0<Vc<Vr, while the shift range is the R-range, the shift range is changed to the N-range after the power recovery of the instantaneous interruption of the vehicle power. In the above case, the processing of the learning of the reference position of the actuator 30 executed by the SBW-ECU 13 will be described referring to the time chart in FIG. 8.

A time point t30 is a power recovery time point of the instantaneous interruption of the vehicle power.

Figure 8:
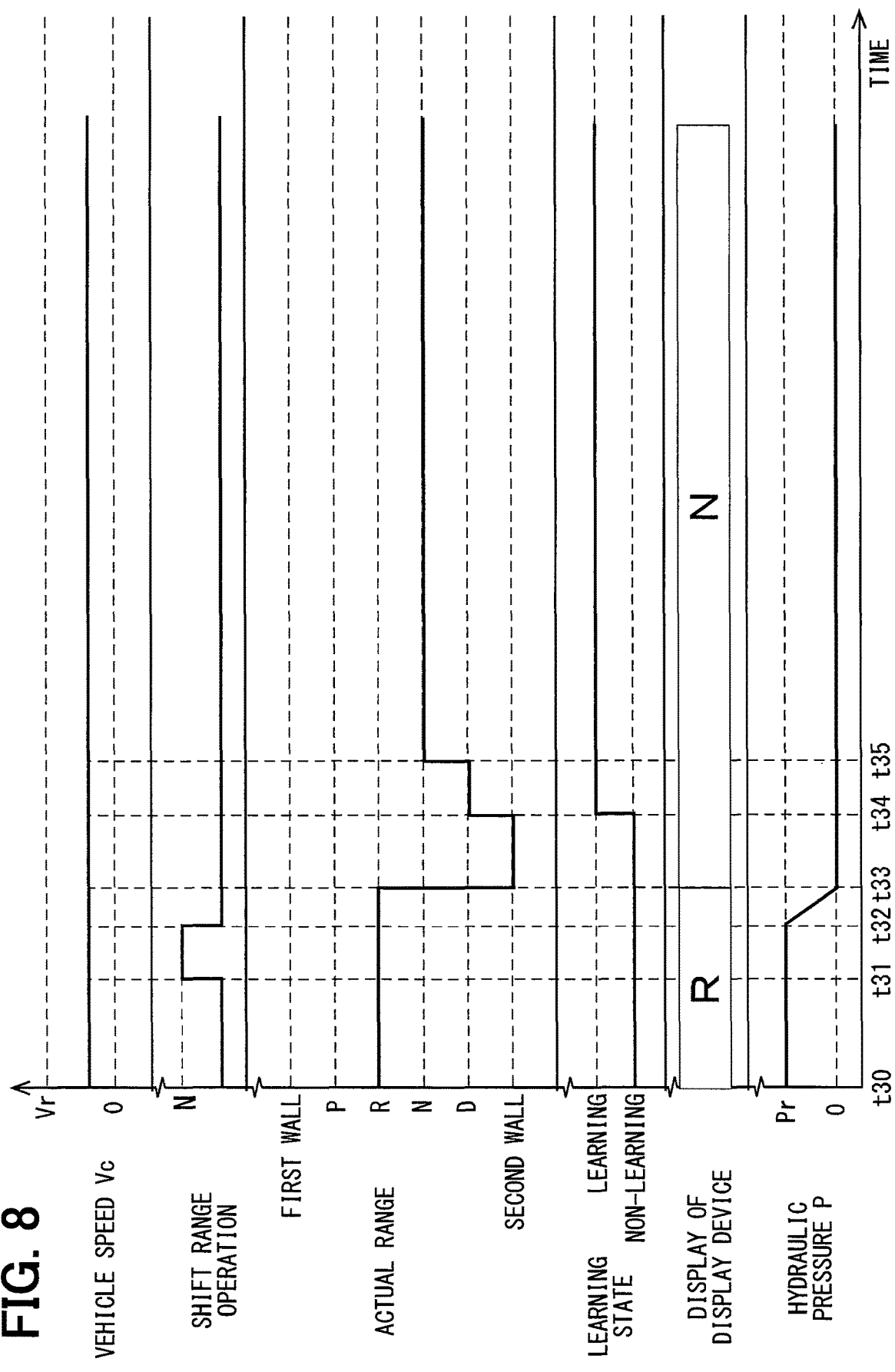
FIG. 8 is a time chart relating to the learning of the rotation position of the actuator caused by the shift-by-wire system according to the first embodiment of the present disclosure.

As shown in FIG. 8, the power recovers at the time point t30 after the instantaneous interruption of the vehicle power, and the operation of the shift range is not executed until a time point t31. The R-range is displayed at the display device 47 as the actual range. Since the actual range is the R-range, the hydraulic pressure P of the hydraulic pressure circuit 21 is the hydraulic-pressure predetermined value Pr.

A signal to set the target range to the N-range is output at the time point t31, and a processing of setting the target range to the N-range is completed at a time point t32. The hydraulic pressure P decreases in response to the hydraulic pressure circuit 21 at the time point t32, and the hydraulic pressure P becomes zero at a time point t33.

At the time point t33, the display device 47 switches to display the R-range from the N-range.

The detent roller 53 is in contact with the second wall 66 and the learning of the second reference position is executed at the time point t33, and the learning of the second reference position is completed at a time point t34.

The shift range is switched to the D-range at the time point t34, and the shift range is switched to the N-range at a time point t35.

A time interval from the time point t33 to the time point t35, similar to the time interval from the time point t02 to the time point t04, is about 0.5 seconds.

When the vehicle moves forward and the vehicle speed Vc is greater than or equal to the vehicle-speed predetermined value Vr, Vr Vc. In this case, the vehicle speed Vc, for example, is 20 km/h.

Figure 9:
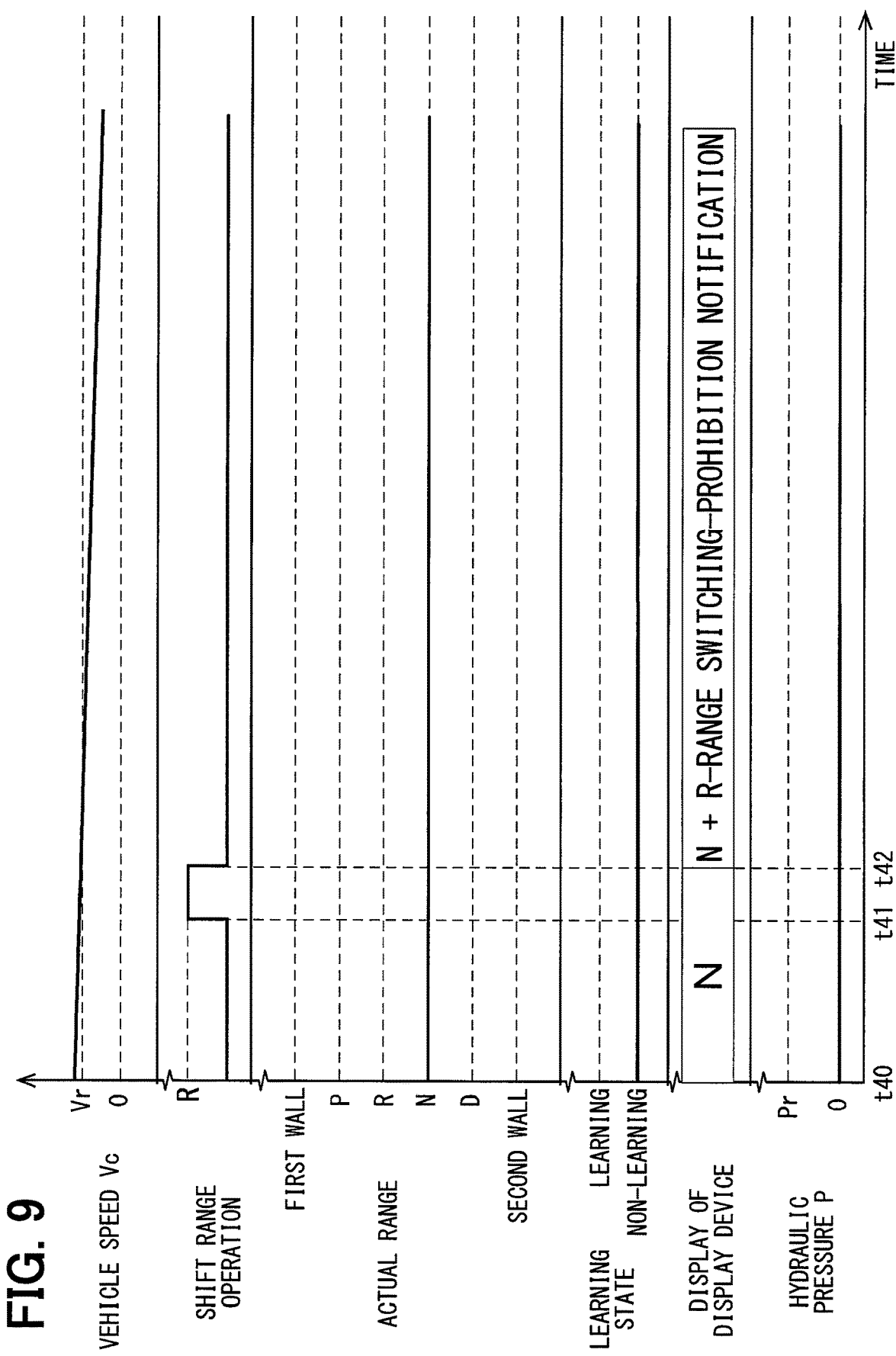
FIG. 9 is a time chart relating to the learning of the rotation position of the actuator caused by the shift-by-wire system according to the first embodiment of the present disclosure.

In the above case, the processing of the learning of the reference position of the actuator 30 executed by the SBW-ECU 13, in a case where the shift range is changed to the R-range after power recovery of an instantaneous interruption of the vehicle power while the shift range is the N-range, is described referring to the time chart in FIG. 9.

A time point t40 is a power recovery time point of the instantaneous interruption of the vehicle power.

As shown in FIG. 9, the power recovers at the time point t40 after the instantaneous interruption of the vehicle power, and the operation of the shift range is not executed until a time point t41. The N-range is displayed at the display device 47 as the actual range, and the hydraulic pressure P of the hydraulic pressure circuit 21 is zero.

A signal where the SBW-ECU 13 is to set the target range to the R-range is output at the time point t41, and a processing of setting the target range to the R-range is completed at a time point t42.

At the time point t42, the display device 47 displays the N-range and an R-range switching-prohibition notification. After the time point t42, the hydraulic pressure is still zero and the shift range is still N-range.

Since it is possible that the engine 40 stops due to the switching of the shift range in an opposite direction when the vehicle speed Vc is greater than or equal to the vehicle-speed predetermined value Vr, the display device 47 displays the R-range switching-prohibition notification.

When the vehicle moves backward and the vehicle speed Vc is greater than or equal to the vehicle-speed predetermined value Vr while the shift range is the R-range, the shift range is changed to the N-range after the power recovery of the instantaneous interruption of the vehicle power. In the above case, the processing of the learning of the reference position of the actuator 30 executed by the SBW-ECU 13 will be described referring to the time chart in FIG. 10.

A time point t50 is a power recovery time point of the instantaneous interruption of the vehicle power.

Figure 10:
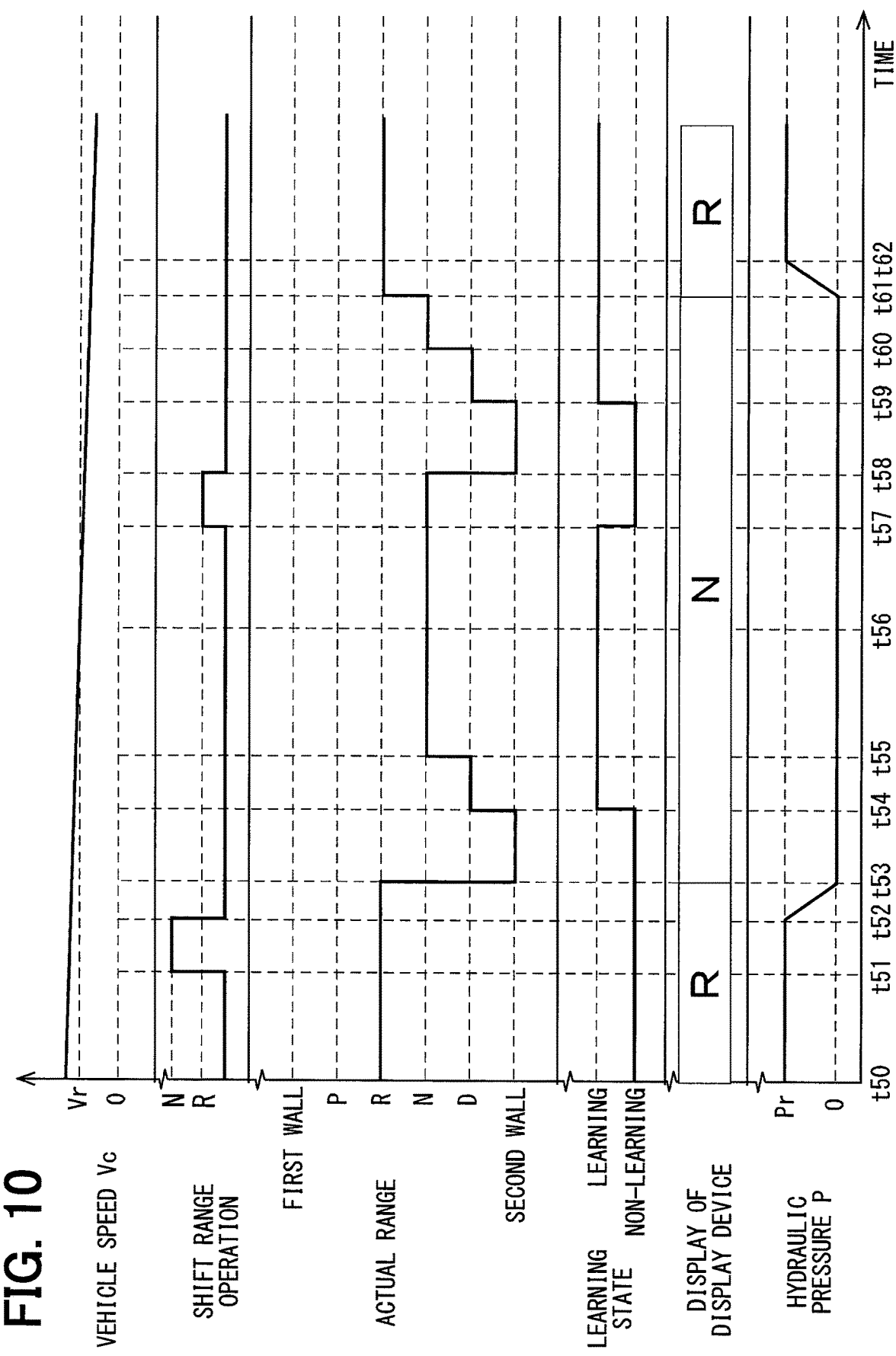
FIG. 10 is a time chart relating to the learning of the rotation position of the actuator caused by the shift-by-wire system according to the first embodiment of the present disclosure.

As shown in FIG. 10, the power recovers at the time point t50 after the instantaneous interruption of the vehicle power, and the operation of the shift range is not executed until a time point t51. The R-range is displayed at the display device 47 as the actual range, and the hydraulic pressure P of the hydraulic pressure circuit 21 is the hydraulic-pressure predetermined value Pr.

A signal to set the target range to the N-range is output at the time point t51, and a processing of setting the target range to the N-range is completed at a time point t52. The hydraulic pressure P decreases in response to the hydraulic pressure circuit 21 at the time point t52, and the hydraulic pressure P becomes zero at a time point t53.

At the time point t53, the display device 47 displays the N-range from the R-range.

The detent roller 53 is in contact with the second wall 66 and the learning of the second reference position is executed at the time point t53, and the learning of the second reference position is completed at a time point t54.

The shift range is switched to the D-range at the time point t54, and the shift range is switched to the N-range at a time point t55.

A time point t56 is a time point where the vehicle power is instantaneously interrupted again and the then the power recovers. In the above case, a learning state is reset, and the operation of the shift range is not executed until a time point t57. The N-range is displayed at the display device 47 as the actual range, and the hydraulic pressure P is zero.

A signal to set the target range to the R-range is output at the time point t57, and a processing of setting the target range to the R-range is completed at a time point t58.

The detent roller 53 is in contact with the second wall 66 and the learning of the second reference position is executed at the time point t58, and the learning of the first reference position is completed at a time point t59.

The actual range is switched to the D-range at the time point t59, the actual range is switched to the N-range at a time point t60, and the actual range is switched to the R-range at a time point t61.

The hydraulic pressure P increases in response to the hydraulic pressure circuit 21 at the time point t61, and the hydraulic pressure P becomes the hydraulic-pressure predetermined value Pr at a time point t62.

At the time point t61, the display device 47 displays the R-range from the N-range.

A time interval from the time point t53 to the time point t55 and a time interval from the time point t58 to the time point t61, similar to the time interval from the time point t02 to the time point t04, are about 0.5 seconds.

Next, the processings of the learning of the reference position of the actuator 30 executed by the SBW-ECU 13 will be described referring to flowcharts in FIGS. 11, 12, 13 and 14. Hereinafter, in the flowcharts, a symbol S indicates step.

Figure 11:
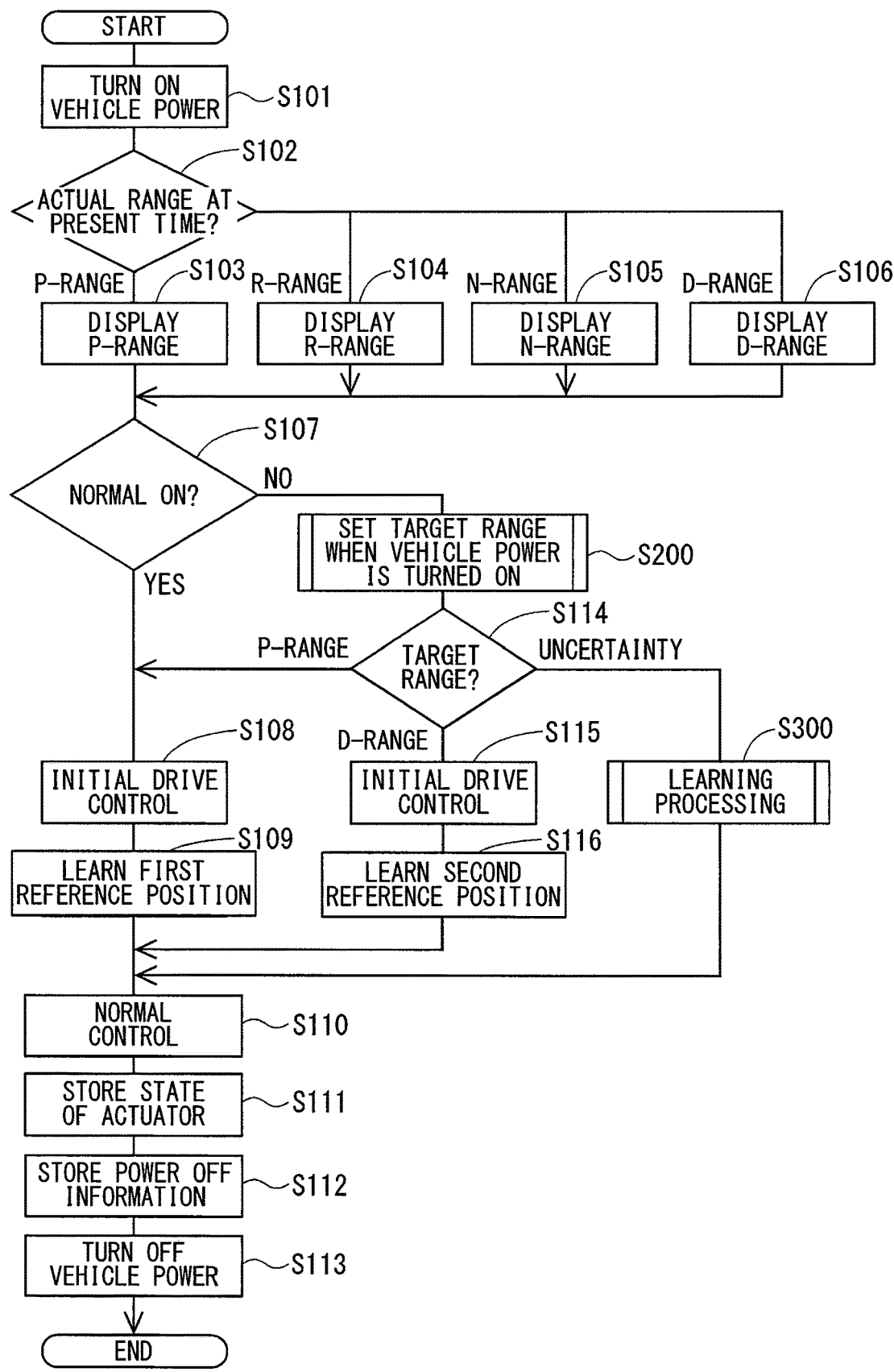
FIG. 11 is a flowchart showing a processing relating to the learning of the rotation position of the actuator caused by the shift-by-wire system according to the first embodiment of the present disclosure.

As shown in FIG. 11, at S101, the vehicle power is turned on, and a power is supplied to the vehicle control system 1. A case where the vehicle power is turned on includes a case where the driver stops the vehicle and intentionally turns off the vehicle power by an ignition key and then normally turns on the vehicle power by the ignition key again, for example. Further, the case where the vehicle power is turned on includes a case where the vehicle power is turned off due to a malfunction without respect to an intention of the driver and then the vehicle power is automatically turned on.

An operation where the driver stops the vehicle and intentionally turns off the vehicle power by the ignition key and then turns on the vehicle power by the ignition key is referred to as a normal on. Further, an operation where the vehicle power is turned off due to a malfunction without respect to the intention of the driver and then the vehicle power is automatically turned on is referred to as a post-instantaneous interruption on.

At S102, the SBW-ECU 13 determines whether the actual range at the present time is one of the P-range, the R-range, the N-range and the D-range, after the vehicle power is turned on.

When the SBW-ECU 13 determines that the actual range at the present time is the P-range, the processing proceeds to S103. At S103, the display device 47 displays the P-range.

When the SBW-ECU 13 determines that the actual range at the present time is the R-range, the processing proceeds to S104. At S104, the display device 47 displays the R-range.

When the SBW-ECU 13 determines that the actual range at the present time is the N-range, the processing proceeds to S105. At S105, the display device 47 displays the N-range.

When the SBW-ECU 13 determines that the actual range at the present time is the D-range, the processing proceeds to S106. At S106, the display device 47 displays the D-range.

At S107, the SBW-ECU 13 determines whether a power on at S101 is the normal on caused by a normal on operation of the driver or is the post-instantaneous interruption on caused by a recovery of the instantaneous interruption of the vehicle power. In this case, the SBW-ECU 13 executes a determination in S107 by referring to information relating to a power off stored in the storage unit 15 when a preceding vehicle power is turned off. The SBW-ECU 13 and the storage unit 15 function as a power-on determination unit.

When the power-on determination unit determines that the power on at S101 is the normal on caused by the normal on operation of the driver, the processing proceeds to S108.

When the power-on determination unit determines that the power on at S101 is the post-instantaneous interruption on caused by the recovery of the instantaneous interruption of the vehicle power, the processing proceeds to S200.

At S108, the SBW-ECU 13 executes the initial drive control of the actuator 30 to control the actuator 30 to rotate appropriately.

At S109, the SBW-ECU 13 learns the first reference position of the actuator 30. After S109, the processing proceeds to S110.

At S200, the SBW-ECU 13 sets the target range when the vehicle power is turned on. A processing in S200 will be described referring to FIG. 12.

Figure 12:
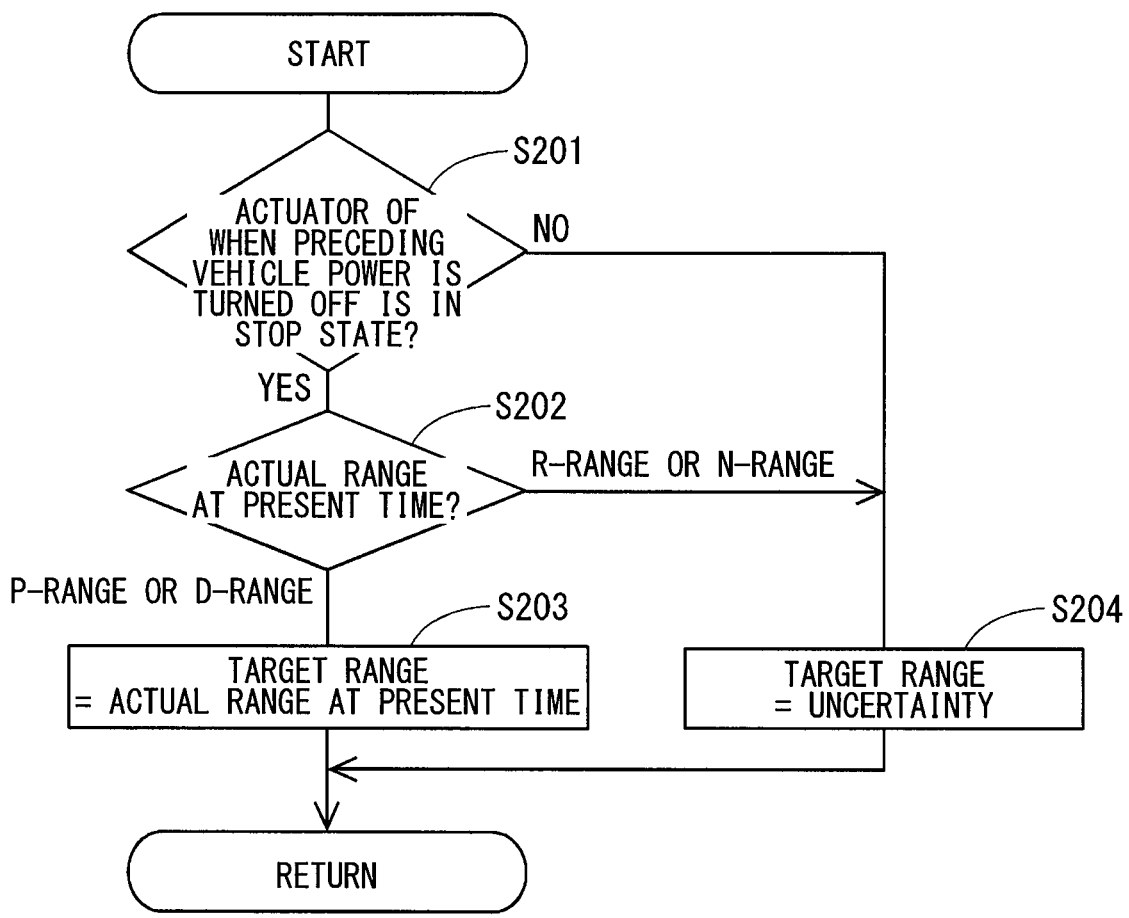
FIG. 12 is a flowchart showing a sub processing of a processing flow in FIG. 11.

As shown in FIG. 12, at S201, the SBW-ECU 13 determines whether the actuator 30 of when the preceding vehicle power is turned off is in a stop state.

The SBW-ECU 13 executes a determination in S201 by referring to a state of the actuator 30 which is stored when the preceding vehicle power is turned off.

When a stored state of the actuator 30 is the stop state, the SBW-ECU 13 determines that the actuator 30 of when the preceding vehicle power is turned off is in the stop state.

When the stored state of the actuator 30 is an operation state, the SBW-ECU 13 determines that the actuator 30 of when the preceding vehicle power is turned off is not in the stop state. In other words, in this case, the SBW-ECU 13 determines that the actuator 30 of when the preceding vehicle power is turned off is in the operation state.

When the SBW-ECU 13 determines that the actuator 30 of when the preceding vehicle power is turned off is in the stop state, the processing proceeds to S202.

When the SBW-ECU 13 determines that the actuator 30 of when the preceding vehicle power is turned off is in the operation state, the processing proceeds to S204.

At S202, the SBW-ECU 13 determines whether the actual range at the present time is one of the P-range, the R-range, the N-range and the D-range, again.

When the SBW-ECU 13 determines that the actual range at the present time is the P-range of the D-range, the processing proceeds to S203.

When the SBW-ECU 13 determines that the actual range at the present time is the R-range or the N-range, the processing proceeds to S204.

At S203, the SBW-ECU 13 sets the actual range at the present time as the target range.

At S204, the SBW-ECU 13 sets uncertainty as the target range.

Return to FIG. 11, after S203 or S204, the processing proceeds to S114.

At S114, the SBW-ECU 13 determines whether the target range is one of the P-range, the D-range, the R-range and the N-range.

When the SBW-ECU 13 determines that the target range is the P-range, the processing proceeds to S108.

When the SBW-ECU 13 determines that the target range is the D-range, the processing proceeds to S115.

When the SBW-ECU 13 determines the target range is uncertainty, the processing proceeds to S300.

At S115, the SBW-ECU 13 executes the initial drive control of the actuator 30 to control the actuator 30 to rotate appropriately.

At S116, the SBW-ECU 13 learns the second reference position of the actuator 30. After S116, the processing proceeds to S110.

At S110, the SBW-ECU 13 executes the normal control of the shift-by-wire system 3. The SBW-ECU 13 timely calculates the rotation position of the actuator 30 corresponding to each shift range, based on the first reference position and the first predetermined values which are learned or based on the second reference position and the second predetermined values which are learned. The SBW-ECU 13 controls the actuator 30 to the rotation position that is calculated.

In the normal control, the SBW-ECU 13 functions as a target-range determination unit. Thus, the SBW-ECU 13 sets the target range based on the signal of the selector sensor 46, the signal of the vehicle speed sensor 24 or the like. The SBW-ECU 13 controls the rotation of the actuator 30 to control the shift range of the automatic transmission 20 to be the target range that is set.

At S111, the SBW-ECU 13 stores the state of the actuator 30 at the present time in the storage unit 15. Specifically, the SBW-ECU 13 stores a timing where the state of the actuator 30 switches from the stop state to the operation state or a timing where the state of the actuator 30 switches from the operation state to the stop state, in the storage unit 15.

The SBW-ECU 13 rewrites the state of the actuator 30 which is stored in the storage unit 15 to the operation state or the stop state. Since the state of the actuator 30 is stored in the storage unit 15 including a nonvolatile memory which is rewritable such as an EEPROM, the state does not disappear even though a supply of power to the storage unit 15 is cut off. In addition, in the processing in S201, the state of the actuator 30 which is latest stored is referred to as the state of the actuator 30 of when the vehicle power is turned off.

At S112, when an off operation of the vehicle power is executed by the driver, the SBW-ECU 13 stores information indicating that an off of the vehicle power is executed in response to a normal off operation, as information relating to power off, in the storage unit 15. Since the information relating to the power off is stored in the storage unit 15 including a nonvolatile memory which is rewritable such as an EEPROM, the information does not disappear even though a supply of power to the storage unit 15 is cut off. In a processing in S107, the information relating to the power off which is stored is referred to as information for determining a type of the power on. According to the present embodiment, a case where the off of the vehicle power is executed by the normal off operation is equivalent to a case where the off of the vehicle power is not an instantaneous interruption.

At S113, when the vehicle power is turned off, the processing shown in FIG. 11 is completed. A case where the vehicle power is turned off includes a case where the driver stops the vehicle and intentionally normally turns off the vehicle power by an ignition key, for example, and a case where the vehicle power is instantaneously turned off due to a malfunction without respect to an intention of the driver.

In addition, even though the vehicle power is turned off at S113, the state of the actuator 30 and the information relating to the power off which are stored in the storage unit 15 at S111 and S112 do not disappear.

Conventionally, in a shift-by-wire system according to Patent Literature 1, in the power recovery of the instantaneous interruption of the vehicle power, a learning state of the reference position is reset, and a notification or a warning is displayed to the driver when the target range is the R-range or the N-range. In the above displaying, a learning of the reference position is executed again, and normally recovers. In the above case, it is possible that the driver is uncomfortable in response to a displaying of the notification or the warning when the shift-by-wire system does not fail.

The shift-by-wire system 3 according to the present embodiment has a simple configuration and can safely recover to a normal control state even though the vehicle power is instantaneously interrupted.

At S300, when the target range is the R-range or the N-range, the SBW-ECU 13 safely sets the normal control state even though the vehicle power is instantaneously interrupted.

Figure 13:
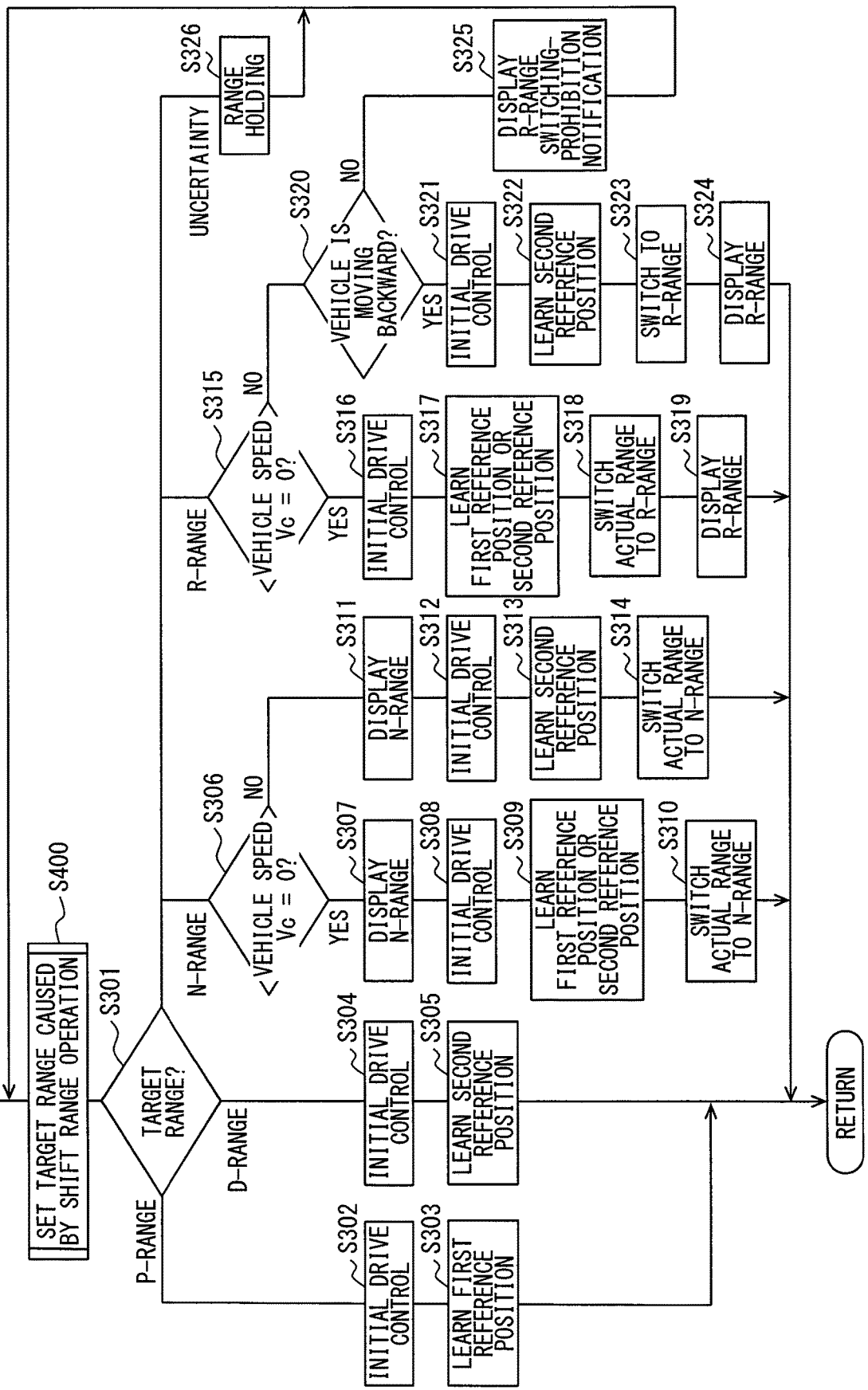
FIG. 13 is a flowchart showing a sub processing of the processing flow in FIG. 11.

As shown in FIG. 13, at S400, the SBW-ECU 13 executes a setting of the target range caused by a shift range operation, again.

Figure 14:
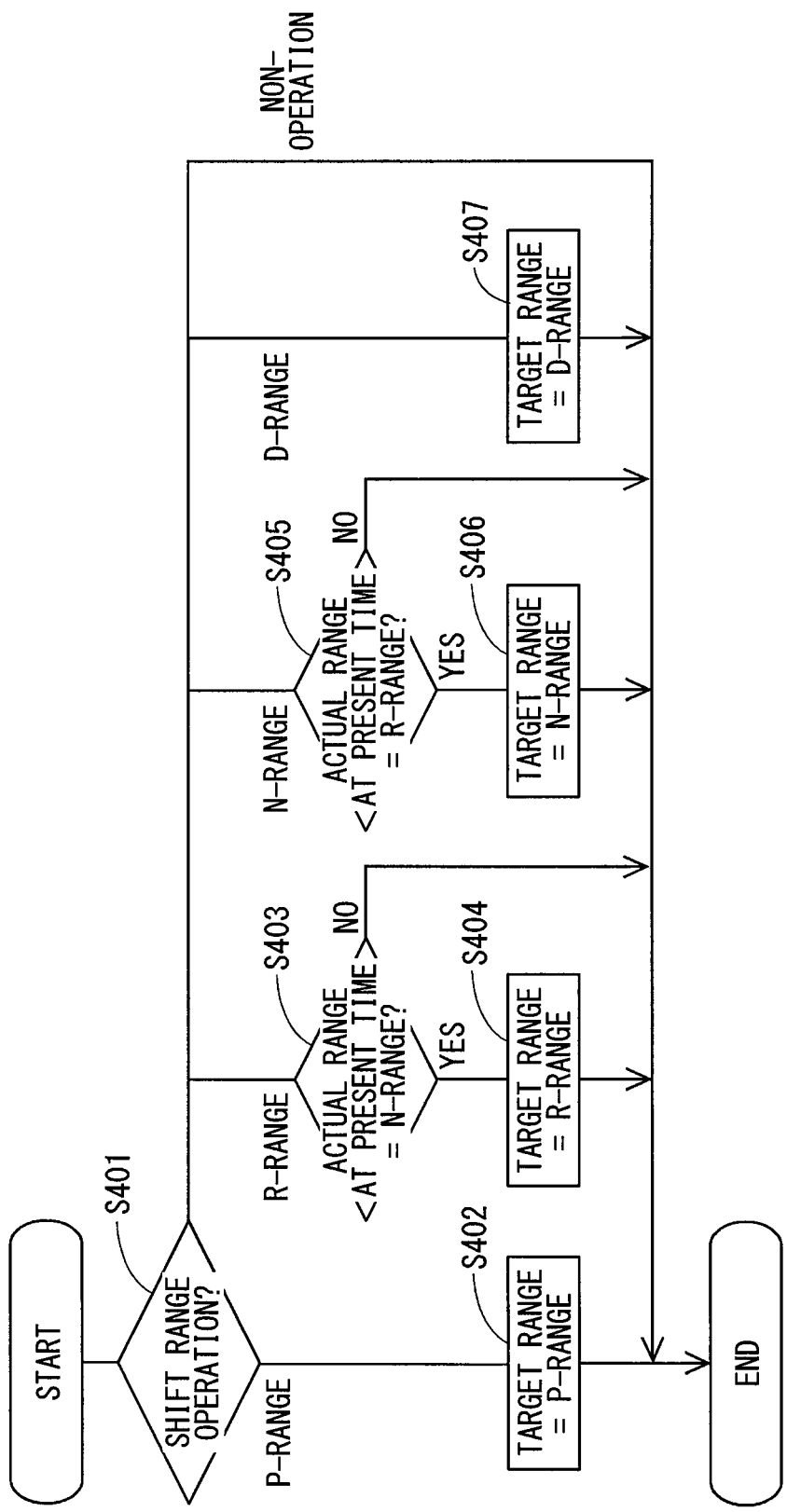
FIG. 14 is a flowchart showing a sub processing of a processing flow in FIG. 13.

As shown in FIG. 14, at S401, the shift range operation is executed by the driver.

When the shift range is directed to the P-range, the processing proceeds to S402.

When the shift range is directed to the R-range, the processing proceeds to S403.

When the shift range is directed to the N-range, the processing proceeds to S405.

When the shift range is directed to the D-range, the processing proceeds to S407.

When the shift range operation is not executed, the processing proceeds to S301.

At S402, the SBW-ECU 13 sets the target range to the P-range, and the processing proceeds to S301.

At S403, the SBW-ECU 13 determines whether the actual range at the present time is the N-range.

When the actual range at the present time is the N-range, the processing proceeds to S404.

When the actual range at the present time is not the N-range, the processing proceeds to S301.

At S404, the SBW-ECU 13 sets the target range to the R-range, and the processing proceeds to S301.

At S405, the SBW-ECU 13 determines whether the actual range at the present time is the R-range.

When the actual range at the present time is the R-range, the processing proceeds to S406.

When the actual range at the present time is not the R-range, the processing proceeds to S301.

At S406, the SBW-ECU 13 sets the target range to the N-range, and the processing proceeds to S301.

At S407, the SBW-ECU 13 sets the target range to the D-range, and the processing proceeds to S301.

At S301, the SBW-ECU 13 determines whether the target range set by the processing in S400 is one of the P-range, the D-range, the N-range and the R-range.

When the SBW-ECU 13 determines that the target range is the P-range, the processing proceeds to S302.

When the SBW-ECU 13 determines that the target range is the D-range, the processing proceeds to S304.

When the SBW-ECU 13 determines that the target range is the N-range, the processing proceeds to S306.

When the SBW-ECU 13 determines that the target range is the R-range, the processing proceeds to S315.

When the SBW-ECU 13 determines that the target range is uncertainty, the processing proceeds to S326.

At S302, the SBW-ECU 13 executes the initial drive control of the actuator 30 to control the actuator 30 to rotate appropriately.

At S303, the SBW-ECU 13 learns the first reference position of the actuator 30. After S303, the processing proceeds to S110.

At S304, the SBW-ECU 13 executes the initial drive control of the actuator 30 to control the actuator 30 to rotate appropriately.

At S305, the SBW-ECU 13 learns the second reference position of the actuator 30. After S305, the processing proceeds to S110.

At S306, the SBW-ECU 13 determines whether the vehicle speed Vc detected by the vehicle speed sensor 24 is zero.

When the SBW-ECU 13 determines that the vehicle speed Vc is zero, the processing proceeds to S307.

When the SBW-ECU 13 determines that the vehicle speed Vc is greater than zero, the processing proceeds to S311.

At S307, the SBW-ECU 13 controls the display device 47 to display the N-range.

At S308, the SBW-ECU 13 executes the initial drive control of the actuator 30 to control the actuator 30 to rotate appropriately.

At S309, the SBW-ECU 13 learns the first reference position or the second reference position of the actuator 30.

At S310, the SBW-ECU 13 switches the actual range to the N-range. After S310, the processing proceeds to S110.

At S311, the SBW-ECU 13 controls the display device 47 to display the N-range.

At S312, the SBW-ECU 13 executes the initial drive control of the actuator 30 to control the actuator 30 to rotate appropriately.

At S313, the SBW-ECU 13 learns the second reference position of the actuator 30.

At S314, the SBW-ECU 13 switches the actual range to the N-range. After S314, the processing proceeds to S110.

At S315, the SBW-ECU 13 determines whether the vehicle speed Vc is zero.

When the SBW-ECU 13 determines that the vehicle speed Vc is zero, the processing proceeds to S316.

When the SBW-ECU 13 determines that the vehicle speed Vc is greater than zero, the processing proceeds to S320.

At S316, the SBW-ECU 13 executes the initial drive control of the actuator 30 to control the actuator 30 to rotate appropriately.

At S317, the SBW-ECU 13 learns the first reference position or the second reference position of the actuator 30.

At S318, the SBW-ECU 13 switches the actual range to the R-range.

At S319, the SBW-ECU 13 controls the display device 47 to display the R-range. After S319, the processing proceeds to S110.

At S320, the SBW-ECU 13 determines whether the vehicle is moving backward.

When the SBW-ECU 13 determines that the vehicle is moving backward, the processing proceeds to S321.

When the SBW-ECU 13 determines that the vehicle is not moving backward, that is, when the SBW-ECU 13 determines that the vehicle is moving forward, the processing proceeds to S325. Whether the vehicle is moving forward or backward is determined by the vehicle speed sensor 24.

At S321, the SBW-ECU 13 executes the initial drive control of the actuator 30 to control the actuator 30 to rotate appropriately.

At S322, the SBW-ECU 13 learns the second reference position of the actuator 30.

At S323, the SBW-ECU 13 switches the actual range to the R-range.

At S324, the SBW-ECU 13 controls the display device 47 to display the R-range. After S324, the processing proceeds to S110.

At S325, the SBW-ECU 13 controls the display device 47 to display the N-range and the R-range switching-prohibition notification. The SBW-ECU 13 executes the switching of the R-range when the vehicle is moving forward as the above description to prevent an engine stop.

After S325, the processing returns to S400.

At S326, the SBW-ECU 13 executes a range holding to maintain the actual range at the present time, without driving the actuator 30.

After S326, similar to S325, the processing returns to S400.

Since the shift-by-wire system 3 according to the present embodiment does not display the notification and the warning to the driver in the processing where the actual range is switched from the N-range to the R-range or from the R-range to the N-range while the power recovers after the instantaneous interruption of the vehicle power, the driver is comfortable. Further, the power can be safely recovered according to states of the vehicle.

Second Embodiment

A second embodiment is similar to the first embodiment except for a control factor that is a pressing of the brake pedal. In other words, according to the second embodiment, the SBW-ECU does not use the vehicle speed as the control factor.

Processings of the learning of the reference position of the actuator 30 executed by the SBW-ECU 13 will be described referring to time charts in FIGS. 15 and 16.

When the brake pedal 48 is pressed while the shift range is the N-range, the shift range is changed to the R-range after the power recovery of the instantaneous interruption of the vehicle power. In the above case, the processing of the learning of the reference position of the actuator 30 executed by the SBW-ECU 13 will be described referring to the time chart in FIG. 15.

A time point t70 is a power recovery time point of the instantaneous interruption of the vehicle power. ON shown in FIGS. 15 and 16 indicates a pressed state where the brake pedal 48 is pressed, and OFF shown in FIGS. 15 and 16 indicates a non-pressed state where the brake pedal 48 is not pressed.

Figure 15:
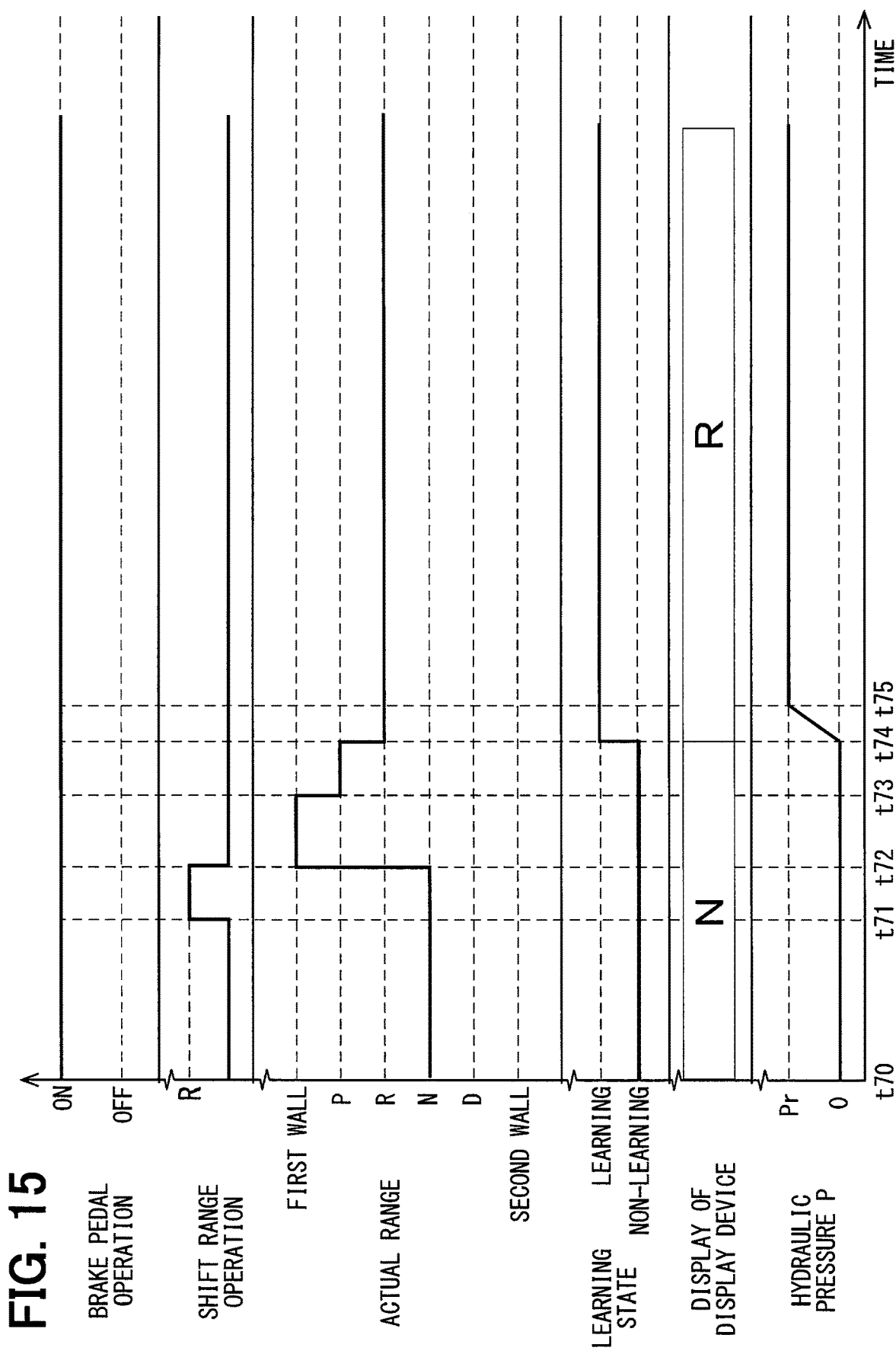
FIG. 15 is a time chart relating to the learning of the rotation position of the actuator caused by the shift-by-wire system according to a second embodiment of the present disclosure.

As shown in FIG. 15, the brake pedal 48 is in the pressed state from the time point t70.

The power recovers at the time point t70 after the instantaneous interruption of the vehicle power, and an operation of the shift range is not executed until a time point t71. The N-range is displayed at the display device 47 as the actual range. Since the actual range is the N-range, the hydraulic pressure P of the hydraulic pressure circuit 21 is zero.

A signal to set the target range to the R-range is output at the time point t71, and a processing of setting the target range to the R-range is completed at a time point t72.

The detent roller 53 is in contact with the first wall 65 and the learning of the first reference position is executed at the time point t72, and the learning of the first reference position is completed at a time point t73.

The actual range is switched to the P-range at the time point t73, and the actual range is switched to the R-range at a time point t74.

At the time point t74, the display device 47 displays the R-range from the N-range, and the hydraulic pressure P increases in response to the hydraulic pressure circuit 21.

At a time point t75, the hydraulic pressure P becomes the hydraulic-pressure predetermined value Pr.

Similar to the first embodiment, a time interval from a time point that the learning of the first reference position starts to a time point that the switching of the shift range is completed, that is, a time interval from the time point t72 to the time point t74, is set to a time interval which is around 0.5 seconds.

When the brake pedal 48 is not pressed while the shift range is the N-range, the shift range is changed to the R-range after the power recovery of the instantaneous interruption of the vehicle power. In the above case, the processing of the learning of the reference position of the actuator 30 executed by the SBW-ECU 13 will be described referring to the time chart in FIG. 16.

A time point t80 is a power recovery time point of the instantaneous interruption of the vehicle power.

Figure 16:
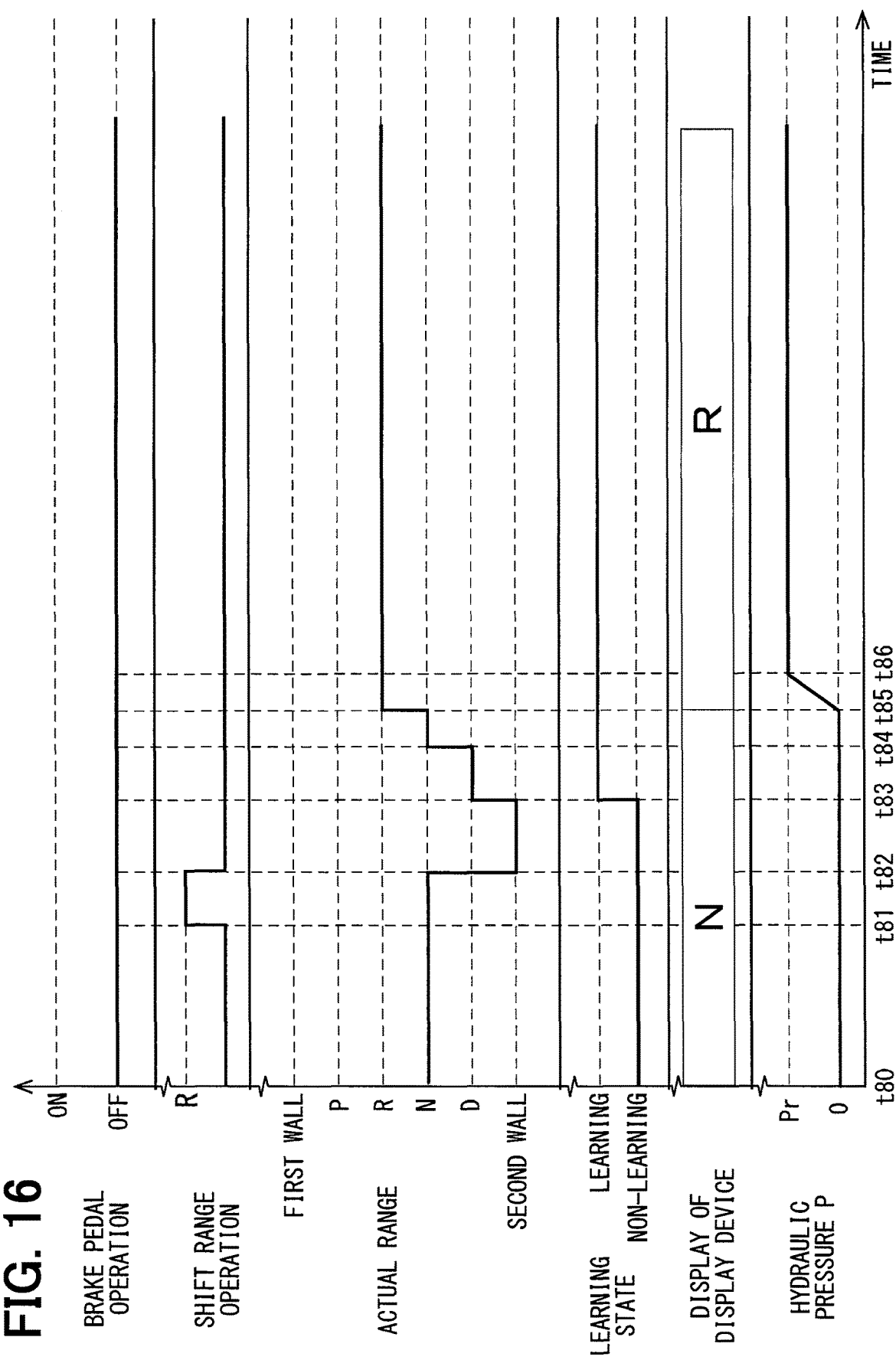
FIG. 16 is a time chart relating to the learning of the rotation position of the actuator caused by the shift-by-wire system according to the second embodiment of the present disclosure.

As shown in FIG. 16, the brake pedal 48 is in the non-pressed state from the time point t80.

The power recovers at the time point t80 after the instantaneous interruption of the vehicle power, and an operation of the shift range is not executed until a time point t81. The N-range is displayed at the display device 47 as the actual range. Since the actual range is the N-range, the hydraulic pressure P of the hydraulic pressure circuit 21 is zero.

A signal to set the target range to the R-range is output at the time point t81, and a processing of setting the target range to the R-range is completed at a time point t82.

The detent roller 53 is in contact with the second wall 66 and the learning of the second reference position is executed at the time point t82, and the learning of the second reference position is completed at a time point t83.

The actual range is switched to the D-range at the time point t83, the actual range is switched to the N-range at a time point t84, and the actual range is switched to the R-range at a time point t85.

At the time point t85, the display device 47 displays the R-range from the N-range, and the hydraulic pressure P increases in response to the hydraulic pressure circuit 21.

At a time point t86, the hydraulic pressure P becomes the hydraulic-pressure predetermined value Pr.

Similar to the first embodiment, a time interval from a time point that the learning of the first reference position starts to a time point that the switching of the shift range is completed, that is, a time interval from the time point t82 to the time point t85, is set to a time interval which is around 0.5 seconds.

When the shift range is switched from the R-range to the N-range or from the N-range to the R-range while the brake pedal 48 is pressed, the SBW-ECU 13 learns the first reference position. When the shift range is switched from the R-range to the N-range or from the N-range to the R-range while the brake pedal 48 is not pressed, the SBW-ECU 13 learns the second reference position.

The processing of the learning of the reference position of the actuator 30 executed by the SBW-ECU 13 will be described referring to a flowchart in FIG. 17.

According to the second embodiment, a part of the processing in S300 is different from the first embodiment.

Figure 17:
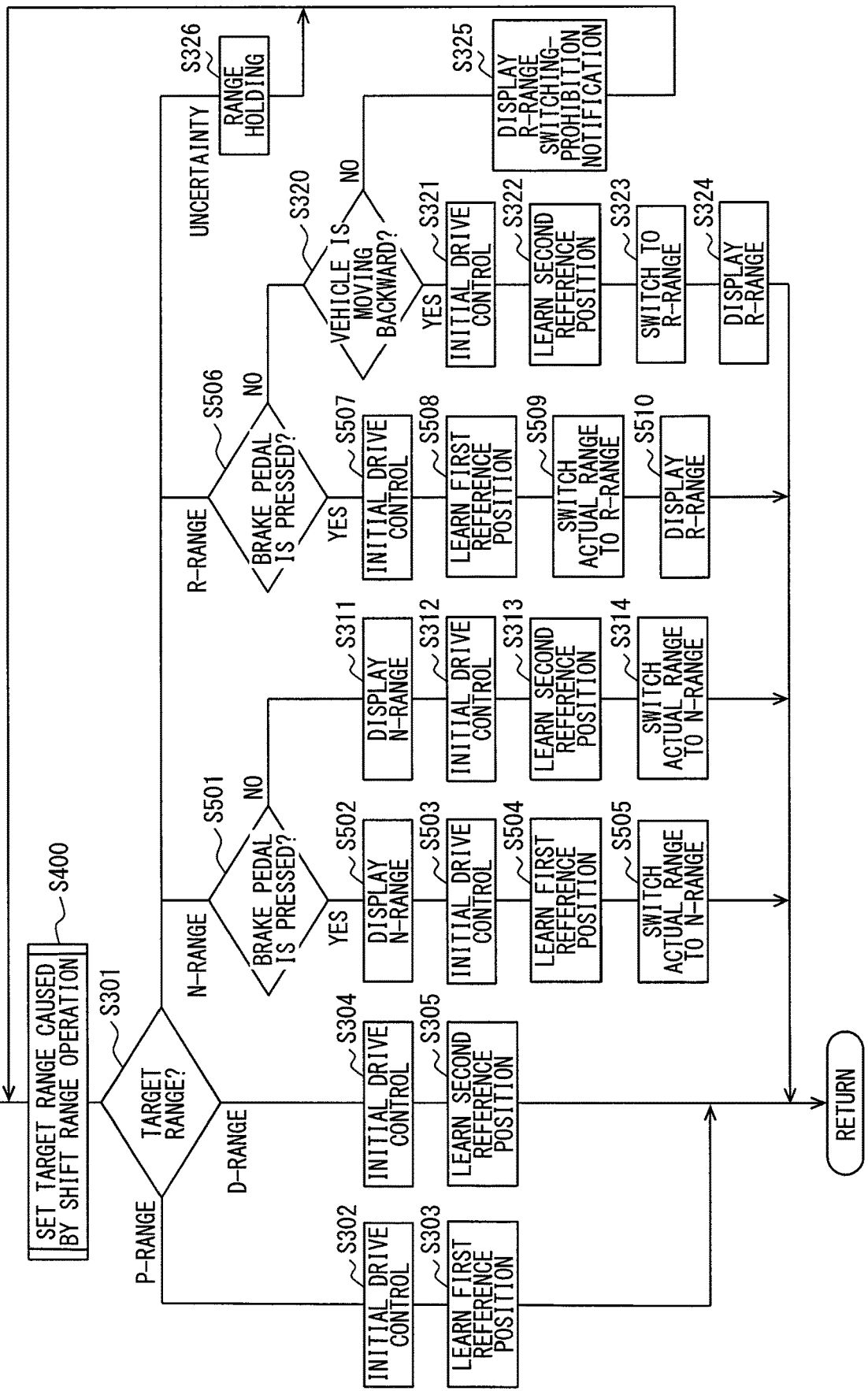
FIG. 17 is a time chart relating to the learning of the rotation position of the actuator caused by the shift-by-wire system according to the second embodiment of the present disclosure.

As shown in FIG. 17, since S400, S301 to S305, S311 to S314 and S320 to S326 are the same as those in the first embodiment, the description thereof will be omitted.

At S301, when the target range set at the processing in S400 is the N-range, the processing proceeds to S501.

When the target range is the R-range, the processing proceeds to S506.

At S501, the SBW-ECU 13 determines whether the brake pedal 48 is pressed.

When the SBW-ECU 13 determines that the brake pedal 48 is pressed, the processing proceeds to S502.

When the SBW-ECU 13 determines that the brake pedal 48 is not pressed, the processing proceeds to S311.

At S502, the SBW-ECU 13 controls the display device 47 to display the N-range.

At S503, the SBW-ECU 13 executes the initial drive control of the actuator 30 to control the actuator 30 to rotate appropriately.

At S504, the SBW-ECU 13 learns the first reference position of the actuator 30.

At S505, the SBW-ECU 13 switches the actual range to the N-range. After S505, the processing proceeds to S110.

At S506, the SBW-ECU 13 determines whether the brake pedal 48 is pressed.

When the SBW-ECU 13 determines that the brake pedal 48 is pressed, the processing proceeds to S507.

When the SBW-ECU 13 determines that the brake pedal 48 is not pressed, the processing proceeds to S320.

At S507, the SBW-ECU 13 executes the initial drive control of the actuator 30 to control the actuator 30 to rotate appropriately.

At S508, the SBW-ECU 13 learns the second reference position of the actuator 30.

At S509, the SBW-ECU 13 switches the actual range to the R-range.

At S510, the SBW-ECU 13 controls the display device 47 to display the R-range. After S510, the processing proceeds to S110.

When the SBW-ECU 13 learns the first reference position or the second reference position based on the state of the brake pedal 48, the same effects as the first embodiment will be obtained.

Third Embodiment

A third embodiment is similar to the first embodiment except for a control factor that is an accelerator opening degree. In other words, according to the third embodiment, the SBW-ECU does not use the vehicle speed as the control factor.

Processings of the learning of the reference position of the actuator 30 executed by the SBW-ECU 13 will be described referring to time charts in FIGS. 18 and 19.

When the accelerator opening degree Ac is less than an opening-degree predetermined value Ar, that is, when Ac<Ar, while the shift range is the N-range, the shift range is changed to the R-range after the power recovery of the instantaneous interruption of the vehicle power. In the above case, the processing of the learning of the reference position of the actuator 30 executed by the SBW-ECU 13 will be described referring to the time chart in FIG. 18. The opening-degree predetermined value Ar is a value that is optionally set, or is calculated by a test value or a simulation.

A time point t90 is a power recovery time point of the instantaneous interruption of the vehicle power.

Figure 18:
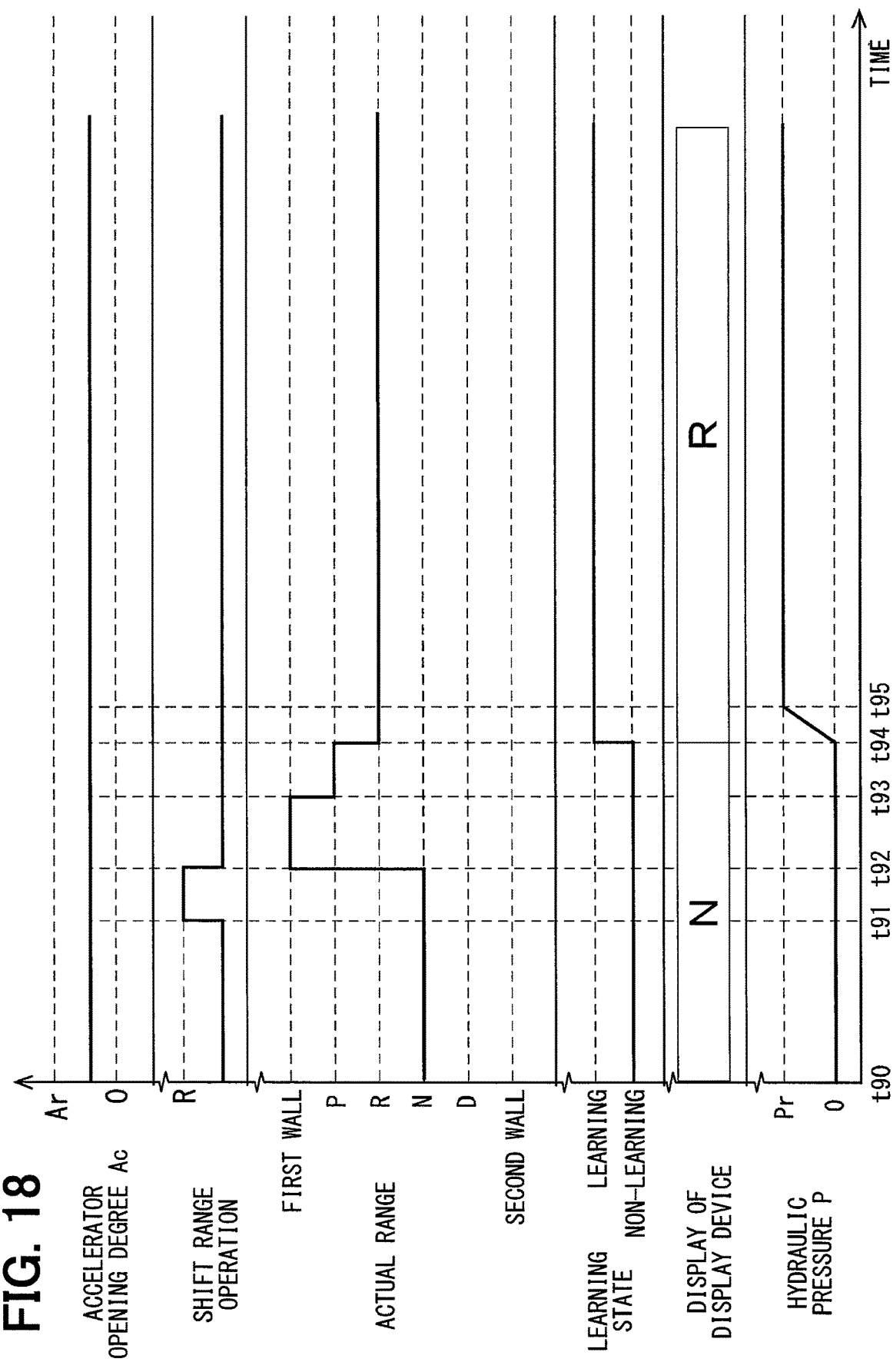
FIG. 18 is a time chart relating to the learning of the rotation position of the actuator caused by the shift-by-wire system according to a third embodiment of the present disclosure.

As shown in FIG. 18, the accelerator opening degree Ac is less than the opening-degree predetermined value Ar from the time point t90.

The power recovers at the time point t90 after the instantaneous interruption of the vehicle power, and an operation of the shift range is not executed until a time point t91. The N-range is displayed at the display device 47 as the actual range. Since the actual range is the N-range, the hydraulic pressure P of the hydraulic pressure circuit 21 is zero.

A signal to set the target range to the R-range is output at the time point t91, and a processing of setting the target range to the R-range is completed at a time point t92.

The detent roller 53 is in contact with the first wall 65 and the learning of the first reference position is executed at the time point t92, and the learning of the first reference position is completed at a time point t93.

The actual range is switched to the P-range at the time point t93, and the actual range is switched to the R-range at a time point t94.

At the time point t94, the display device 47 displays the R-range from the N-range, and the hydraulic pressure P increases in response to the hydraulic pressure circuit 21.

At a time point t95, the hydraulic pressure P becomes the hydraulic-pressure predetermined value Pr.

Similar to the first embodiment, a time interval from a time point that the learning of the first reference position starts to a time point that the switching of the shift range is completed, that is, a time interval from the time point t92 to the time point t94, is set to a time interval which is around 0.5 seconds.

When the accelerator opening degree Ac is greater than or equal to the opening-degree predetermined value Ar, that is, when Ar Ac, while the shift range is the N-range, the shift range is changed to the R-range after the power recovery of the instantaneous interruption of the vehicle power. In the above case, the processing of the learning of the reference position of the actuator 30 executed by the SBW-ECU 13 will be described referring to the time chart in FIG. 19.

A time point t100 is a power recovery time point of the instantaneous interruption of the vehicle power.

Figure 19:
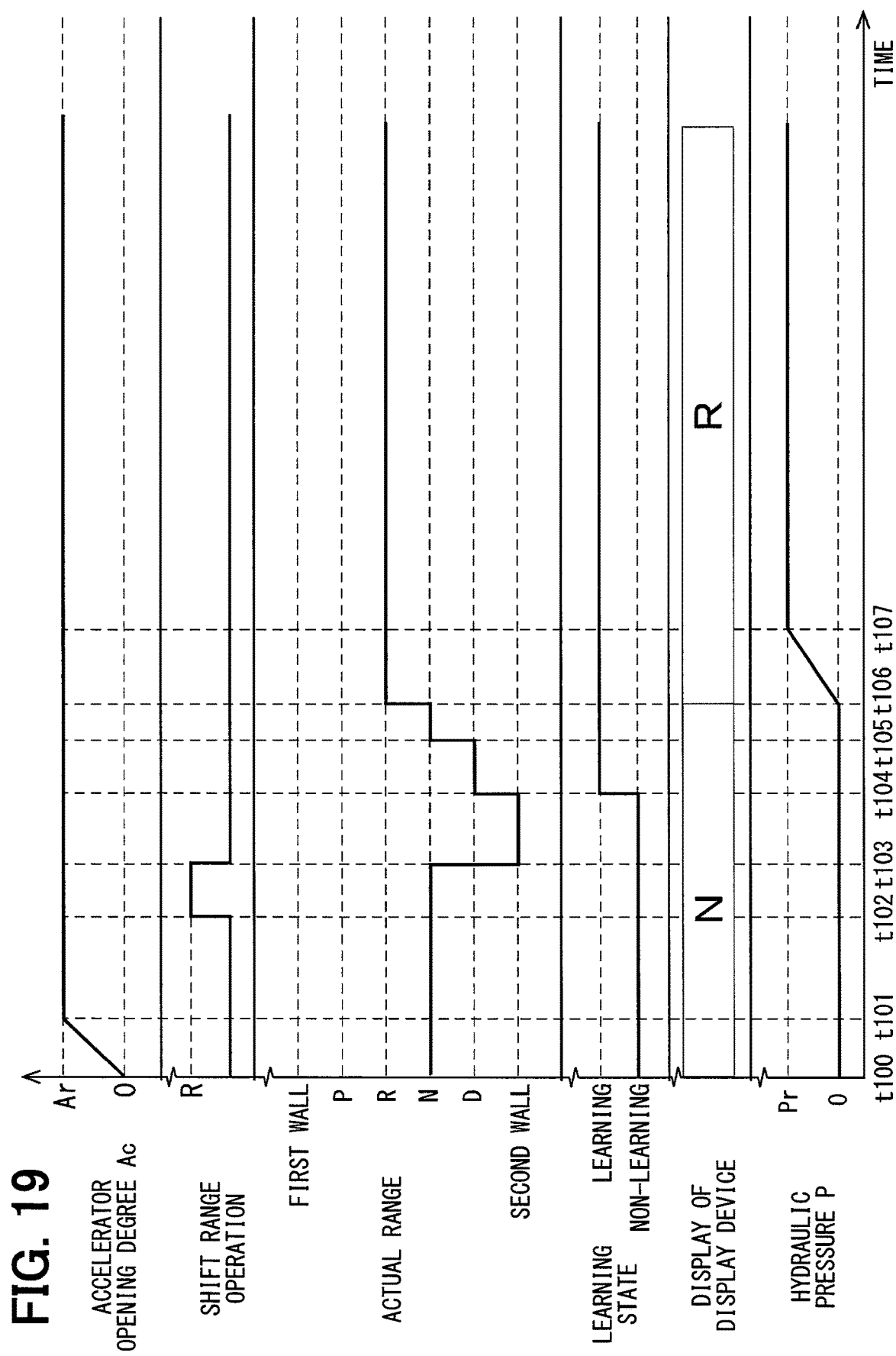
FIG. 19 is a time chart relating to the learning of the rotation position of the actuator caused by the shift-by-wire system according to the third embodiment of the present disclosure.

As shown in FIG. 19, at the time point t100, the accelerator opening degree Ac is zero while the accelerator pedal 43 is in a non-pressed state. The accelerator pedal 43 starts to be pressed from the time point t100, and the accelerator opening degree Ac becomes greater than or equal to the opening-degree predetermined value Ar at a time point t101.

The power recovers at the time point t100 after the instantaneous interruption of the vehicle power, and an operation of the shift range is not executed until a time point t102. The N-range is displayed at the display device 47 as the actual range. Since the actual range is the N-range, the hydraulic pressure P of the hydraulic pressure circuit 21 is zero.

A signal to set the target range to the R-range is output at the time point t102, and a processing of setting the target range to the R-range is completed at a time point t103.

The detent roller 53 is in contact with the second wall 66 and the learning of the second reference position is executed at the time point t103, and the learning of the second reference position is completed at a time point t104.

The actual range is switched to the D-range at the time point t104, the actual range is switched to the N-range at a time point t105, and the actual range is switched to the R-range at a time point t106.

At the time point t106, the display device 47 displays the R-range from the N-range, and the hydraulic pressure P increases in response to the hydraulic pressure circuit 21.

At a time point t107, the hydraulic pressure P becomes the hydraulic-pressure predetermined value Pr.

Similar to the first embodiment, a time interval from a time point that the learning of the first reference position starts to a time point that the switching of the shift range is completed, that is, a time interval from the time point t103 to the time point t106, is set to a time interval which is around 0.5 seconds.

When the shift range is switched from the R-range to the N-range or from the N-range to the R-range while the accelerator opening degree Ac is less than the opening-degree predetermined value Ar, the SBW-ECU 13 learns the first reference position. When the shift range is switched from the R-range to the N-range or from the N-range to the R-range while the accelerator opening degree Ac is greater than or equal to the opening-degree predetermined value Ar, the SBW-ECU 13 learns the second reference position.

The processing of the learning of the reference position of the actuator 30 executed by the SBW-ECU 13 will be described referring to a flowchart in FIG. 20.

According to the third embodiment, a part of the processing in S300 is different from the first embodiment.

Figure 20:
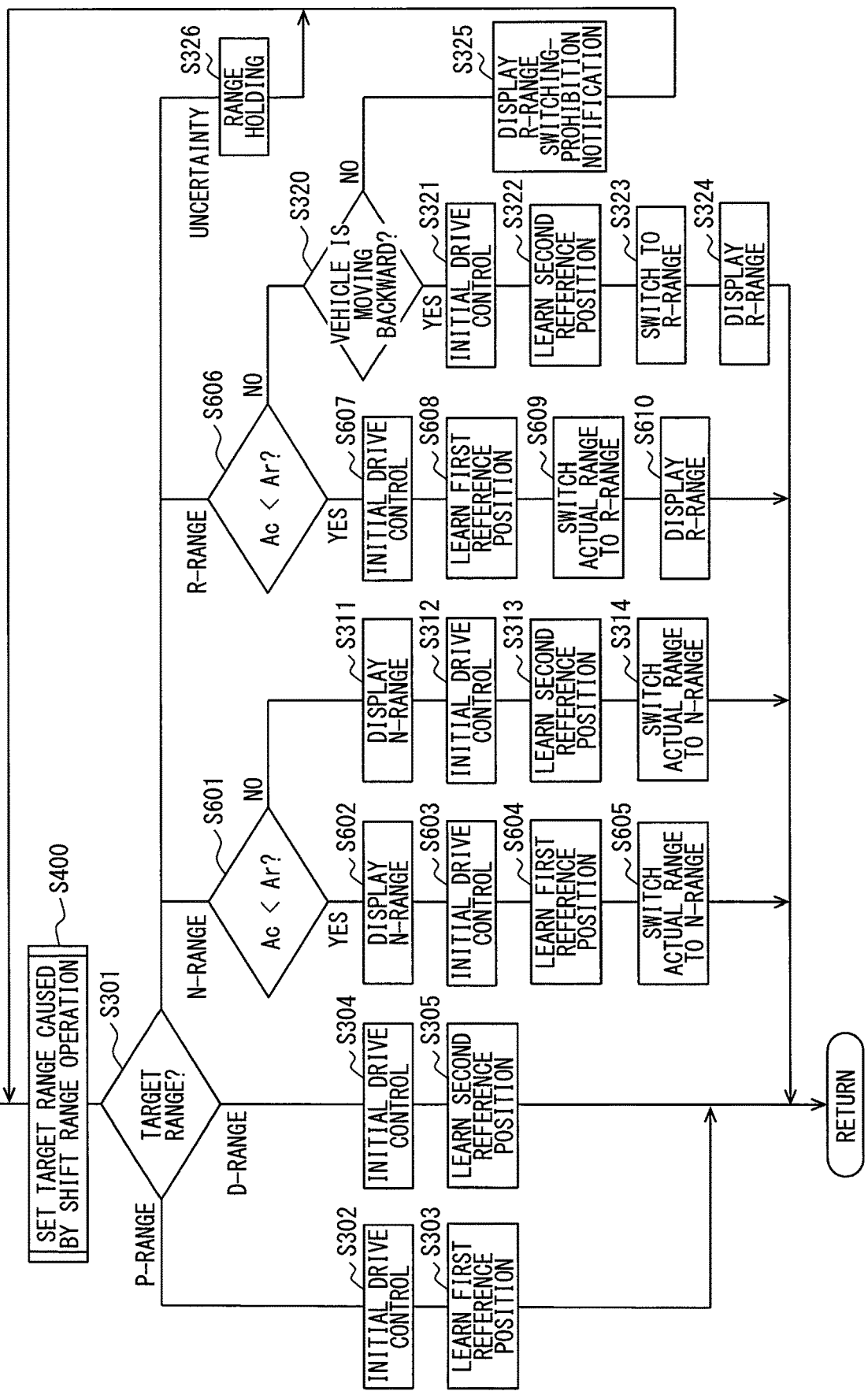
FIG. 20 is a flowchart showing a processing relating to the learning of the rotation position of the actuator caused by the shift-by-wire system according to the third embodiment of the present disclosure.

As shown in FIG. 20, since S400, S301 to S305, S311 to S314 and S320 to S326 are the same as those in the first embodiment, the description thereof will be omitted.

At S301, when the target range set at the processing in S400 is the N-range, the processing proceeds to S601.

When the target range is the R-range, the processing proceeds to S606.

At S601, the SBW-ECU 13 determines whether the accelerator opening degree Ac is less than the opening-degree predetermined value Ar.

When the SBW-ECU 13 determines that the accelerator opening degree Ac is less than the opening-degree predetermined value Ar, the processing proceeds to S602.

When the SBW-ECU 13 determines that the accelerator opening degree Ac is greater than or equal to the opening-degree predetermined value Ar, the processing proceeds to S311.

At S602, the SBW-ECU 13 controls the display device 47 to display the N-range.

At S603, the SBW-ECU 13 executes the initial drive control of the actuator 30 to control the actuator 30 to rotate appropriately.

At S604, the SBW-ECU 13 learns the first reference position of the actuator 30.

At S605, the SBW-ECU 13 switches the actual range to the N-range. After S605, the processing proceeds to S110.

At S606, the SBW-ECU 13 determines whether the accelerator opening degree Ac is less than the opening-degree predetermined value Ar.

When the SBW-ECU 13 determines that the accelerator opening degree Ac is less than the opening-degree predetermined value Ar, the processing proceeds to S607.

When the SBW-ECU 13 determines that the accelerator opening degree Ac is greater than or equal to the opening-degree predetermined value Ar, the processing proceeds to S320.

At S607, the SBW-ECU 13 executes the initial drive control of the actuator 30 to control the actuator 30 to rotate appropriately.

At S608, the SBW-ECU 13 learns the second reference position of the actuator 30.

At S609, the SBW-ECU 13 switches the actual range to the R-range.

At S610, the SBW-ECU 13 controls the display device 47 to display the R-range. After S610, the processing proceeds to S110.

When the SBW-ECU 13 learns the first reference position or the second reference position based on a state of the accelerator opening degree Ac, the same effects as the first embodiment will be obtained.

Other Embodiments (i) Ideas of the first embodiment, the second embodiment and the third embodiment may be combined. In other words, the SBW-ECU may control by using the vehicle speed Vc, the brake pedal or the accelerator opening degree of the accelerator pedal. By increasing a total number of control factors, a controllability of the SBW-ECU is improved.

The present disclosure should not be limited to the embodiments described above, and various other embodiments may be implemented without departing from the scope of the present disclosure.

While the present disclosure has been described with reference to the embodiments thereof, it is to be understood that the disclosure is not limited to the embodiments and constructions. The present disclosure is intended to cover various modifications and equivalent arrangements. In addition, while the various combinations and configurations, which are preferred, other combinations and configurations, including more, less or only a single element, are also within the spirit and scope of the present disclosure.

The invention claimed is:

1. A shift-by-wire system that switches a shift range of an automatic transmission in response to a signal transmitted from a shift selection unit operated by a driver of a vehicle,
    an actuator including a motor part that is rotatable by a power, an encoder that outputs a pulse signal in response to a rotation of the motor part and is configured to detect an actual range of the automatic transmission, and a deceleration part that decelerates and outputs the rotation of the motor part;
    a detent plate connected with the deceleration part and configured to rotate by the actuator, the detent plate including a first recession part that is located at one side of a rotation direction, a second recession part that is located at the other side of the rotation direction, and a plurality of intermediate recession part that is interposed between the first recession part and the second recession part;
    a detent spring including a limitation part, the detent spring to limit a rotation of the detent plate while the limitation part is fitted into the first recession part, the plurality of the intermediate recession parts or the second recession part, the detent spring configured to fix the shift range of the automatic transmission;

a control unit including a target-range determination unit to determine a target range based on the signal transmitted from the shift selection unit, the control unit to control a rotation of the actuator to control the shift range of the automatic transmission to be the target range determined by the target-range determination unit; and a display device located in front of a driving seat of the vehicle, the display device configured to display the actual range detected by the encoder, wherein the first recession part corresponds to a P-range that is a range for parking and includes a first wall located at a position opposite to the second recession part, the second recession part corresponds to a D-range that is a range for moving forward or a lowest speed gear range, the second recession part includes a second wall located at a position opposite to the first recession part, the plurality of the intermediate recession parts corresponds to an R-range that is a range for moving backward, an N-range that is a neutral range or a range for moving forward other than the lowest speed gear range, the control unit includes
  a first position learning unit to learn a first reference position of the actuator corresponding to the P-range, by detecting a state where a minimum value or a maximum value of a counter value of the pulse signal output from the encoder does not change in a predetermined time interval when the actuator rotates in a direction where the rotation of the actuator is limited while the limitation part is in contact with the first wall,
  a second position learning unit to learn a second reference position of the actuator corresponding to the D-range or the lowest speed gear range, by detecting a state where the minimum value or the maximum value of the counter value of the pulse signal output from the encoder does not change in the predetermined time interval when the actuator rotates in a direction where the rotation of the actuator is limited while the limitation part is in contact with the second wall, and
  a power-on determination unit to determine whether a power on is a normal on caused by a normal on operation of the driver or is a post-instantaneous interruption on caused by a recovery of an instantaneous interruption of a vehicle power where the vehicle power is turned on, and when the power-on determination unit determines that the power on is the normal on caused by the normal on operation of the driver where the vehicle power is turned on, the control unit learns the first reference position by the first position learning unit, and when the power-on determination unit determines that the power on is the post-instantaneous interruption on caused by the recovery of the instantaneous interruption of the vehicle power where the vehicle power is turned on,
  (i) the control unit learns the first reference position by the first position learning unit or learns the second reference position by the second position learning unit, in a case where the display device still displays the N-range after the target-range determination unit determines the target range to the R-range while the display device displays the N-range, and
  (ii) the control unit learns the first reference position by the first position learning unit or learns the second reference position by the second position learning unit, in a case where the display device displays the N-range after the target-range determination unit determines the target range to the N-range while the display device displays the R-range.

2. The shift-by-wire system according to claim 1, further comprising:

a vehicle speed sensor configured to measure a speed of the vehicle, wherein the control unit
  in a case where the power-on determination unit determines the power on is the post-instantaneous interruption on caused by the recovery of the instantaneous interruption of the vehicle power while the vehicle power is turned on,
  when the target-range determination unit determines the target range to the R-range while the display device displays the N-range or when the target-range determination unit determines the target range to the N-range while the display device displays the R-range,
    (i) learns the first reference position in response to the vehicle which is being stopped, by the first position learning unit,
    (ii) learns the second reference position in response to the speed of the vehicle greater than zero, by the second position learning unit.

3. The shift-by-wire system according to claim 1, further comprising:

a brake pedal configured to be operated by the driver of the vehicle and to convert a kinetic energy where the vehicle moves forward or backward into a thermal energy, wherein the control unit
  in a case where the power-on determination unit determines the power on is the post-instantaneous interruption on caused by the recovery of the instantaneous interruption of the vehicle power while the vehicle power is turned on,
  when the target-range determination unit determines the target range to the R-range while the display device displays the N-range or when the target-range determination unit determines the target range to the N-range while the display device displays the R-range,
    (i) learns the first reference position in response to the brake pedal which is pressed, by the first position learning unit,
    (ii) learns the second reference position in response to the brake pedal which is not pressed, by the second position learning unit.

4. The shift-by-wire system according to claim 1, further comprising:

an accelerator sensor configured to detect an operation quantity of an accelerator pedal caused by the driver of the vehicle, wherein the control unit
  in a case where the power-on determination unit determines the power on is the post-instantaneous interruption on caused by the recovery of the instantaneous interruption of the vehicle power while the vehicle power is turned on, when the target-range determination unit determines the target range to the R-range while the display device displays the N-range or when the target-range determination unit determines the target range to the N-range while the display device displays the R-range,
- (i) learns the first reference position in response to the operation quantity of the accelerator pedal less than or equal to a predetermined operation quantity, by the first position learning unit,
- (ii) learns the second reference position in response to the operation quantity of the accelerator pedal greater than the predetermined operation quantity, by the second position learning unit.

5. The shift-by-wire system according to claim 1, wherein when the power-on determination unit determines that the power on is the post-instantaneous interruption on caused by the recovery of the instantaneous interruption of the vehicle power where the vehicle power is turned on, the first position learning unit learns the first reference position while the target-range determination unit determines the target range to the P-range.

6. The shift-by-wire system according to claim 1, wherein when the power-on determination unit determines that the power on is the post-instantaneous interruption on caused by the recovery of the instantaneous interruption of the vehicle power where the vehicle power is turned on, the second position learning unit learns the second reference position while the target-range determination unit determines the target range to the D-range.

7. The shift-by-wire system according to claim 1, further comprising:

a vehicle-traveling determination unit to determine whether the vehicle is moving forward or backward, wherein when the power-on determination unit determines that the power on is the post-instantaneous interruption on caused by the recovery of the instantaneous interruption of the vehicle power where the vehicle power is turned on, the display device displays an R-range switching-prohibition notification and the first position learning unit and the second position learning unit do not learn, when the vehicle-traveling determination unit determines that the vehicle is moving forward while the target-range determination unit determines the target range to the R-range.

8. The shift-by-wire system according to claim 1, wherein when the power-on determination unit determines that the power on is the post-instantaneous interruption on caused by the recovery of the instantaneous interruption of the vehicle power where the vehicle power is turned on, the control unit executes a range holding to maintain the actual range and the first position learning unit and the second position learning unit do not learn when the target-range determination unit determines the target range to uncertainty.

* * * * *